(12) United States Patent
Blake

(10) Patent No.: US 10,616,649 B2
(45) Date of Patent: Apr. 7, 2020

(54) PROVIDING RECOMMENDATIONS BASED ON PASSIVE MICROPHONE DETECTIONS

(71) Applicant: Rovi Guides, Inc., San Jose, CA (US)

(72) Inventor: John Blake, Blemont, CA (US)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 16/039,624

(22) Filed: Jul. 19, 2018

(65) Prior Publication Data
US 2020/0029126 A1    Jan. 23, 2020

(51) Int. Cl.
| H04N 21/466 | (2011.01) |
| H04N 21/258 | (2011.01) |
| G10L 15/26 | (2006.01) |
| H04N 21/25 | (2011.01) |

(52) U.S. Cl.
CPC ......... *H04N 21/4668* (2013.01); *G10L 15/26* (2013.01); *H04N 21/251* (2013.01); *H04N 21/25891* (2013.01)

(58) Field of Classification Search
CPC ............. H04N 21/4668; H04N 21/251; H04N 21/25891
See application file for complete search history.

(56) References Cited

U.S. PATENT DOCUMENTS

| 6,239,794 B1 | 5/2001 | Yuen | |
| 6,564,378 B1 | 5/2003 | Satterfield | |
| 7,165,098 B1 | 1/2007 | Boyer | |
| 7,761,892 B2 | 7/2010 | Ellis | |
| 8,046,801 B2 | 10/2011 | Ellis | |
| 8,798,995 B1* | 8/2014 | Edara | G06Q 30/0255 704/246 |
| 2002/0174430 A1 | 11/2002 | Ellis | |
| 2005/0251827 A1 | 11/2005 | Ellis | |
| 2009/0133051 A1* | 5/2009 | Hildreth | H04N 5/4403 725/28 |
| 2010/0153885 A1 | 6/2010 | Yates | |
| 2011/0072452 A1* | 3/2011 | Shimy | H04N 7/163 725/25 |
| 2012/0290648 A1* | 11/2012 | Sharkey | H04L 67/306 709/204 |
| 2013/0205314 A1* | 8/2013 | Ramaswamy | H04N 21/44213 725/14 |

(Continued)

*Primary Examiner* — Pinkal R Chokshi
(74) *Attorney, Agent, or Firm* — Haley Guiliano LLP

(57) ABSTRACT

Systems and methods for providing media content recommendations. For example, a media guidance application may determine that a phrase spoken by a first user during a conversation with a second user indicates that the first user will not be consuming media content with the second user during a future time interval. In response to determining that the first user will not be consuming media content with the second user during the future time interval, the media guidance application may identify media assets available for consumption during the future time interval having a given characteristic favored by the second user and a characteristic disfavored by the first user. The media guidance application may then generate, for the future time interval, a media content recommendation of a media asset having the given characteristic, and generate for display, to the second user, the media content recommendation.

20 Claims, 12 Drawing Sheets

(56) References Cited

U.S. PATENT DOCUMENTS

| | | | |
|---|---|---|---|
| 2013/0268955 A1* | 10/2013 | Conrad | H04N 21/252 725/12 |
| 2014/0150002 A1* | 5/2014 | Hough | H04N 21/4415 725/9 |
| 2014/0380359 A1* | 12/2014 | Musil | H04N 21/6582 725/34 |
| 2016/0134938 A1* | 5/2016 | Miyazaki | H04N 7/142 348/14.07 |
| 2017/0006343 A1* | 1/2017 | Miller | H04N 21/4668 |
| 2017/0061962 A1* | 3/2017 | Huang | H04N 21/4622 |
| 2017/0134803 A1* | 5/2017 | Shaw | H04N 21/4126 |
| 2017/0208364 A1* | 7/2017 | Glazier | H04N 21/41407 |
| 2017/0220570 A1* | 8/2017 | Tilaye | H04N 21/44218 |
| 2017/0264920 A1* | 9/2017 | Mickelsen | G06K 9/00335 |
| 2017/0323645 A1 | 11/2017 | Edara | |
| 2019/0166403 A1* | 5/2019 | Yelton | H04N 21/4668 |

* cited by examiner

700

702

Begin Subroutine for Determining that a Given Audio Template of a Plurality of Audio Templates Matches a Phrase

704

Generate, via Control Circuitry, an Audio Signature Corresponding to the Phrase

706

Retrieve, from a Database, a Plurality of Audio Signatures Corresponding to the Plurality of Audio Templates

708

Compare, via the Control Circuitry, the Generated Audio Signature to Each of the Plurality of Audio Signatures Corresponding to the Plurality of Audio Templates

1102 — Begin Subroutine for Generating, for a Future Time Interval, a Media Content Recommendation of a Media Asset Corresponding to a Media Asset Identifier Included in the Subset 1104 — Determine, via Control Circuitry, a Degree of Matching of the Characteristic of Each of the Media Assets Corresponding to Media Asset Identifier Included in the Subset of Media Asset Identifiers to the Characteristic Favored by the Second User 1106 — Generate, via the Control Circuitry, a List of the Plurality of Media Assets Corresponding to Media Asset Identifiers Included in the Subset 1108 — Order, via the Control Circuitry, the List According to the Degree of Matching 1110 — Select, via the Control Circuitry, from the List, a Media Asset Identifier of a Media Asset Having a Characteristic with a Highest Degree of Matching as the Media Asset for the Media Content Recommendation

FIG. 11

PROVIDING RECOMMENDATIONS BASED ON PASSIVE MICROPHONE DETECTIONS

BACKGROUND

The present disclosure is directed to media content recommendations systems and methods.

SUMMARY

The advancement in digital transmission of media content has increased the amount of media content that can be made available to an audience. Further, advancements in voice processing are allowing users to provide natural language voice input to media systems, and the media systems may process the voice input to identify commands or information included in the voice input. These advances are particularly prevalent in passive listening devices, e.g., devices that are continuously detecting audio and processing the audio to determine if a voice command has been provided by a user. These advancements enable media systems not only to determine when a user is providing input to the media system, but also to acquire information about the user (or a plurality of users in a household) by processing detected speech even when the user (or users) does not intentionally direct the speech as voice input to the media system. For example, the media system may acquire information regarding the user's media preferences and media consumption schedule based on a conversation between two or more users that is detected by the media system, and may provide media content recommendations to the user based on the acquired information. However, existing media systems consider only the media preferences and media consumption schedule of users that are present for media content recommendations. Thus, in a situation where two users who regularly consume media together have different media preferences, existing media systems will not consider the preferences of a first user when making a media content recommendation for a second user when the first user is absent. As a result, the second user may want to consume media having a particular characteristic, but the second user is unable to do so when the first user is present. For example, the second user may like watching hockey, but the first user does not like watching sports, and therefore the second user does not get the opportunity to watch hockey when the first user is present. The second user may then wish to watch hockey when the second user is consuming media without the first user. However, if only the preferences of the second user are considered when making media content recommendations, the media guidance application may recommend media content that both the first user and the second user favor, even though the first user is absent, because the first user's preferences (e.g., what the first user disfavors) are not considered. Therefore, the media guidance application, when considering only the second user's preferences, may recommend media content that the first user and second user want to consume together, and the content that the second user wants to consume, which the first user disfavors, may not be recommended. For example, if the media guidance application considers only the second user's preferences when providing recommendations of media content for the second user to consume when the first user is absent, the media guidance application may recommend media content that both the first user and the second user favor (e.g., a documentary film). In contrast, if the media guidance application considers both the first user's preferences and the second user's preferences (e.g., what the first user disfavors and what the second user favors) when providing recommendations of media content for the second user to consume when the first user is absent, the media guidance application may recommend media content that the second user wants to consume (e.g., a hockey game) but is unable to consume when the first user is present.

Accordingly, to overcome the problems when providing a user with media content recommendations, systems and methods are provided herein for providing media content recommendations for users who regularly consume media content together, based on media preferences of both users who are present and users who are absent when media content is consumed. For example, a media guidance application may determine, based on a conversation between a first user and a second user received via a microphone, that the first user will not be consuming media content with the second user during a future time interval. In an example, the media guidance application may determine, based on the input, that the first user and the second user are engaged in a conversation, and the first user tells the second user that the first user will be absent during a future time interval. For example, the media guidance application may receive input from the first user saying "I have to work late tonight." The media guidance application may then determine that the second user will be consuming media content without the first user during the future time interval. For example, the media guidance application may determine, based on the second user's media consumption history or schedule, that the second user normally consumes media content at night. The media guidance application may retrieve media preferences of the first user and the second user, and may generate a media content recommendation for the second user based on the preferences of both the first user and the second user. For example, the media guidance application may determine that the first user dislikes watching hockey, and that the second user likes watching hockey. The media guidance application may then further determine that there is a hockey game available for consumption that night, and may generate a media content recommendation for the second viewer to watch the hockey game that night while the first user is working late. As a result, the media guidance application may provide the second user with a media content recommendation that considers both a favored preference of the second user and a disfavored preference of the first user. Thus, the media guidance application may generate recommendations for media content that would not be recommended if only the preferences of the second user were considered.

In some aspects of the disclosure, a media guidance application may receive an input, via a microphone, of a conversation between a first user and a second user. For example, the media guidance application may receive audio via a passive microphone (e.g., a microphone that is always listening without a user first having to activate the microphone) or an active microphone (e.g., a microphone that receives audio only when a user activates the microphone, such as by pressing a button). The media guidance application may process the received audio to determine that the audio includes a conversation between the first user and the second user. For example, the media guidance application may perform digital signal processing including frequency analysis, waveform matching, audio hashing, perceptual hashing, and/or any other digital signal processing method known to those skilled in the art for determining whether audio includes a conversation.

In some embodiments, the media guidance application may detect a phrase spoken by the first user in the conversation. For example, the media guidance application may perform the same and/or additional digital signal processing methods described above to detect the phrase spoken by the first user in the conversation. The media guidance application may further detect a phrase spoken by the second user in the conversation. In an illustrative embodiment, the media guidance application may process the received audio input to detect that the first user has spoken the words "I have to work late tonight" in a conversation with the second user, and may further detect that the second user has said "OK" in response to the first user.

In some embodiments, the media guidance application may determine that a given audio template of a plurality of audio templates matches the phrase. For example, the media guidance application may compare the phrase spoken by the first user in the conversation to a plurality of audio templates to determine whether the phrase matches a given audio template. In the illustrative embodiment, the media guidance application may compare the words "I have to work late tonight" to audio templates of phrases to determine if the words match a given audio template.

In some embodiments, the media guidance application may generate an audio signature corresponding to the phrase. For example, the media guidance application may perform digital signal processing including frequency analysis, peak volume detecting, audio hashing, waveform matching, and/or any other digital signal processing method known to those skilled in the art for generating an audio signature corresponding to a phrase. In the illustrative embodiment, the media guidance application may generate an audio signature corresponding to the words "I have to work late tonight."

In some embodiments, the media guidance application may retrieve, from a database, a plurality of audio signatures corresponding to the plurality of audio templates. For example, the media guidance application may send a query to a database storing audio signatures for audio signatures corresponding to the plurality of audio templates. The media guidance application may then receive, from the database, in response to the query, the plurality of audio signatures corresponding to the plurality of audio templates.

In some embodiments, the media guidance application may compare the generated audio signature to each of the plurality of audio signatures corresponding to the plurality of audio templates. For example, the media guidance application may compare the audio signature corresponding to the phrase with the plurality of audio signatures retrieved from the database to determine if the generated audio signature matches a given audio signature of the plurality of audio signatures. In the illustrative embodiment, the media guidance application may determine that the audio signature corresponding to the words "I have to work late tonight" matches a given audio signature corresponding to a given audio template.

In some embodiments, the media guidance application may determine that the given audio template indicates that the first user will not be consuming media content with the second user during a future time interval. For example, the media guidance application may determine a meaning of the phrase based on the given audio template, and may further determine that the meaning of the phrase indicates that the first user will be absent during a future time interval when the second user intends to consume media. In the illustrative embodiment, the media guidance application may determine that the first user will be working late, and will therefore be absent, that night when the second user intends to consume media.

In some embodiments, the media guidance application may identify a plurality of keywords corresponding to the given audio template. For example, the media guidance application may retrieve metadata associated with the given audio template, and may extract, from the metadata, a plurality of keywords corresponding to the audio template. In the illustrative embodiment, the media guidance application may determine that keywords such as "absent" and "that night" correspond to the given audio template.

In some embodiments, the media guidance application may determine that the plurality of keywords indicate a meaning of the phrase. For example, the media guidance application may identify a meaning of the phrase based on a meaning and/or a context of the keywords. In the illustrative embodiment, the media guidance application may determine that a meaning and/or a context associated with the keywords "absent and "that night" indicate a meaning of the words "I have to work late tonight."

In some embodiments, the media guidance application may determine that the meaning of the phrase indicates that the first user will not be consuming media content with the second user during the future time interval. For example, the media guidance application may determine that the meaning and/or context of the phrase indicates that the first user will be absent during the future time interval, and thus the second user will be consuming media without the first user during the future time interval. In the illustrative embodiment, the media guidance application may determine that the words "I have to work late tonight" mean that the first user will be absent that night, and may further determine, based on a media consumption history and/or media consumption schedule of the second user, that the second user will be consuming media content without the first user that night.

In some embodiments, the media guidance application may identify a subset of media asset identifiers from a plurality of media asset identifiers for media assets available for consumption during the future time interval, of which a characteristic of each media asset corresponding to each media asset identifier in the subset matches a characteristic favored by the second user and a characteristic disfavored by the first user. For example, the media guidance application may identify the future time interval based on the meaning of the phrase, and may then identify a plurality of media assets available for consumption during the future time interval. For example, the media guidance application may query a database for media assets available for consumption during the future time interval, and may then receive, from the database, a plurality of media asset identifiers for media assets available for consumption during the future time interval. In the illustrative embodiment, the media guidance application may determine from the words "I have to work late tonight" that the future time interval is that night, and may then query a database for media assets available for consumption that night and receive, in response, a plurality of identifiers (e.g., titles, links, metadata, graphics, video trailers, synopses, etc.) for media assets available for consumption that night.

In some embodiments, the media guidance application may receive, from a database, a characteristic of each of the plurality of media assets. For example, the media guidance application may query the database for characteristics of each of the media assets available for consumption during the future time interval, and may receive, in response, one or more characteristics of each of the media assets. The characteristics of the media assets may include a type, a genre, a classification, an artist, a director, a composer, a performer, a rating, a content description, a team, and/or any other characteristic of media assets known to those skilled in the art. In the illustrative embodiment, the media guidance application may query the database for characteristics of media assets that are available for consumption that night, and may receive, from the database, characteristics of each of the media assets.

In some embodiments, the media guidance application may retrieve, from the database, a user profile of the second user. For example, the media guidance application may query the database for a user profile of the second user, and may receive from the database, in response to the query, the user profile of the second user. The user profile may include information about the second user, such as user preferences including favored media characteristics and disfavored media characteristics, demographic information, a media consumption history, a media consumption schedule, etc.

In some embodiments, the media guidance application may extract, from the user profile of the second user, a characteristic favored by the second user. For example, the media guidance application may analyze the user profile of the second user and retrieve, from the user profile, a characteristic favored by the second user. In the illustrative embodiment, the media guidance application may extract from the user profile of the second user a preference for hockey.

In some embodiments, the media guidance application may compare the characteristic of each of the plurality of media assets available for consumption during the future time interval with the characteristic favored by the second user. For example, the media guidance application may compare the characteristics of the media assets with the characteristic favored by the second user to determine if any of the characteristics matches. In the illustrative embodiment, the media guidance application may determine whether any of the media assets has a characteristic matching the second user's preference for hockey.

In some embodiments, the media guidance application may identify a second subset of media asset identifiers including media asset identifiers for each of the plurality of media assets having a characteristic that matches the characteristic favored by the second user. For example, the media guidance application may select, from the media asset identifiers corresponding to media assets available for consumption during the future time interval, a plurality of media asset identifiers corresponding to media assets having a characteristic that matches the characteristic favored by the second user. In the illustrative embodiment, the media guidance application may select, from the media assets available for consumption during the future time interval, media asset identifiers corresponding to the media assets having a characteristic matching hockey.

In some embodiments, the media guidance application may retrieve, from the database, a user profile of the first user. For example, the media guidance application may query the database for a user profile of the first user, and may receive from the database, in response to the query, the user profile of the first user. The user profile may include information about the first user, such as user preferences including favored media characteristics and disfavored media characteristics, demographic information, a media consumption history, a media consumption schedule, etc.

In some embodiments, the media guidance application may extract, from the user profile of the first user, a characteristic disfavored by the first user. For example, the media guidance application may analyze the user profile of the first user and retrieve, from the user profile, a characteristic disfavored by the first user. In the illustrative embodiment, the media guidance application may extract from the user profile of the first user a dislike for sports.

In some embodiments, the media guidance application may compare the characteristic of each of the plurality of media assets corresponding to the media asset identifiers included in the second subset of media asset identifiers with the characteristic disfavored by the first user. For example, the media guidance application may compare the characteristics of the media assets with the characteristic disfavored by the first user to determine if any of the characteristics matches. In the illustrative embodiment, the media guidance application may determine whether any of the media assets have a characteristic matching the first user's dislike for sports.

In some embodiments, the media guidance application may select, for inclusion in the first subset of media asset identifiers, media asset identifiers included in the second subset of media asset identifiers for media assets having a characteristic that matches the characteristic disfavored by the first user. For example, the media guidance application may select, for inclusion in the first subset, the identifiers for media assets having a characteristic matching the characteristic disfavored by the first user. In the illustrative embodiment, the media guidance application may select, for inclusion in the first subset, identifiers for media assets having a characteristic matching sports.

In some embodiments, the media guidance application may identify a third subset of media asset identifiers including media asset identifiers for each of the plurality of media assets having a characteristic that matches the characteristic disfavored by the first user. For example, the media guidance application may select, from the media asset identifiers corresponding to media assets available for consumption during the future time interval, a plurality of media asset identifiers corresponding to media assets having a characteristic that matches the characteristic disfavored by the first user. In the illustrative embodiment, the media guidance application may select, from the media assets available for consumption during the future time interval, media asset identifiers corresponding to the media assets having a characteristic matching sports.

In some embodiments, the media guidance application may select, for inclusion in the first subset of media asset identifiers, media asset identifiers included in both the second subset of media asset identifiers and the third subset of media asset identifiers. For example, the media guidance application may select, for inclusion in the first subset, the identifiers for media assets having a characteristic matching the characteristic favored by the second user and matching the characteristic disfavored by the first user. In the illustrative embodiment, the media guidance application may select, for inclusion in the first subset, identifiers for media assets having a characteristic matching hockey and a characteristic matching sports.

In some embodiments, the media guidance application may determine a degree of matching of the characteristic of each of the media assets corresponding to media asset identifiers included in the subset of media asset identifiers to the characteristic favored by the second user. For example, the media guidance application may compare the media asset characteristic of each of the media assets corresponding to media asset identifiers included in the subset with the media asset characteristic favored by the second user, and may determine a degree of matching of the characteristic of the media assets to the characteristic favored by the second user. In the illustrative embodiment, the media guidance application may compare the characteristics of each of the media assets with the second user's preference for hockey, and may determine that a hockey game (e.g., a Stanley Cup playoff game) has a higher degree of matching than a talk show discussing the hockey game, or a newscast reporting a result of the hockey game.

In some embodiments, the media guidance application may generate a list of the plurality of media assets corresponding to media asset identifiers included in the subset. For example, the media guidance application may select all the media asset identifiers included in the subset, and may generate a list including all the selected identifiers.

In some embodiments, the media guidance application may order the list according to the degree of matching. For example, the media guidance application may order the list of media asset identifiers such that media asset identifiers having a characteristic with a higher degree of matching to the characteristic favored by the second user are listed before media asset identifiers having a characteristic with a lower degree of matching to the characteristic favored by the second user. In the illustrative embodiment, the media guidance application may list the hockey game first, the talk show discussing the hockey game second, and the newscast reporting the result of the hockey game third.

In some embodiments, the media guidance application may generate, for the future time interval, a media content recommendation of a media asset corresponding to a media asset identifier included in the subset. For example, the media guidance application may select one of the media assets corresponding to a media asset identifier included in the subset, and may generate a recommendation for the second user to consume the selected media asset during the future time interval. In the illustrative embodiment, the media guidance application may generate a recommendation for the second user to watch the hockey game that night.

In some embodiments, the media guidance application may select, from the list, the media asset identifier of a media asset having a characteristic with the highest degree of matching as the media asset for the media content recommendation. For example, the media guidance application may select the media asset corresponding to the media asset identifier listed first. In the illustrative embodiment, the media guidance application may select the hockey game for the media content recommendation since the media guidance application determined that the hockey game has the highest degree of matching to the second user's preference for hockey.

In some embodiments, the media guidance application may compare a plurality of characteristics disfavored by the first user to a plurality of characteristics favored by the second user. For example, the media guidance application may extract, from the user profile of the first user, a plurality of characteristics disfavored by the first user. Likewise, the media guidance application may extract, from the user profile of the second user, a plurality of characteristics favored by the second user. The media guidance application may then compare the plurality of characteristics disfavored by the first user to the plurality of characteristics favored by the second user. In the illustrative embodiment, the media guidance application may extract, from the user profile of the first user, preferences of the first user indicating that the first user dislikes sports, violent films/television shows, and science fiction. The media guidance application may further extract, from the user profile of the second user, preferences of the second user indicating that the second user favors hockey, basketball, action films, and science fiction. The media guidance application may then compare the characteristics disfavored by the first user (i.e., sports, violent films/television shows, and science fiction) to the characteristics favored by the second user (i.e., hockey, basketball, action films, and science fiction).

In some embodiments, the media guidance application may determine that a given characteristic is one of both the plurality of characteristics disfavored by the first user and the plurality of characteristics favored by the second user. For example, the media guidance application may determine that a given characteristic is disfavored by the first user and favored by the second user. In the illustrative embodiment, the media guidance application may determine that the characteristic science fiction is disfavored by the first user and favored by the second user.

In some embodiments, the media guidance application may select, from the media asset identifiers included in the subset of media asset identifiers, a media asset identifier for a media asset having the given characteristic as the media asset for the media content recommendation. For example, the media guidance application may select a media asset having the characteristic that is both disfavored by the first user and favored by the second user for the media content recommendation. In the illustrative embodiment, the media guidance application may select a media asset having the science fiction characteristic for the media content recommendation.

In some embodiments, the media guidance application may generate for display, to the second user via a user device, the media content recommendation. For example, the media guidance application may generate a notification, message, alert, etc., including text, graphics, videos, links, etc., for the media content recommendation. In the illustrative embodiment, the media guidance application may generate a message with links to the hockey game for the media content recommendation.

In some embodiments, the media guidance application may generate for display, to the second user via the user device, the media content recommendation at the future time interval. For example, the media guidance application may generate the media content recommendation for display to the second user at the future time interval. In the illustrative embodiment, the media guidance application generates the recommendation for the second user to watch the hockey game that night.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart of a detailed illustrative process for determining that a given audio template of a plurality of audio templates matches a phrase, in accordance with some embodiments of the disclosure;

FIG. 11 is a flowchart of a detailed illustrative process for generating a media content recommendation of a media asset corresponding to a media asset identifier included in a subset, in accordance with some embodiments of the disclosure;

DETAILED DESCRIPTION

Systems and methods are thus described for providing media content recommendations for users who regularly consume media content together based on media preferences of both users who are present and users who are absent when media content is consumed. For example, a media guidance application may determine, based on a conversation between a first user and a second user received via a microphone, that the first user will not be consuming media content with the second user during a future time interval. In an example, the media guidance application may determine, based on the input, that the first user and the second user are engaged in a conversation, and the first user tells the second user that the first user will be absent during a future time interval. For example, the media guidance application may receive input from the first user saying "I have to work late tonight." The media guidance application may then determine that the second user will be consuming media content without the first user during the future time interval. For example, the media guidance application may determine, based on the second user's media consumption history or schedule, that the second user normally consumes media content at night. The media guidance application may retrieve media preferences of the first user and the second user, and may generate a media content recommendation for the second user based on the preferences of both the first user and the second user. For example, the media guidance application may determine that the first user dislikes watching hockey, and that the second user likes watching hockey. The media guidance application may then further determine that there is a hockey game available for consumption that night, and may generate a media content recommendation for the second viewer to watch the hockey game that night while the first user is working late. As a result, the media guidance application may provide the second user with a media content recommendation that considers both a favored preference of the second user and a disfavored preference of the first user. Thus, the media guidance application may generate recommendations for media content that would not be recommended if only the preferences of the second user were considered.

While the present disclosure uses a media guidance application as an illustrative media content recommendation system, those skilled in the art will recognize that various other content recommendation systems may be used in addition to or instead of the media guidance application, without departing from the scope of the present disclosure. For example, a recommendation engine or an operating system may be used to perform some or all of the functions and features described below with respect to the media guidance application.

Figure 1:
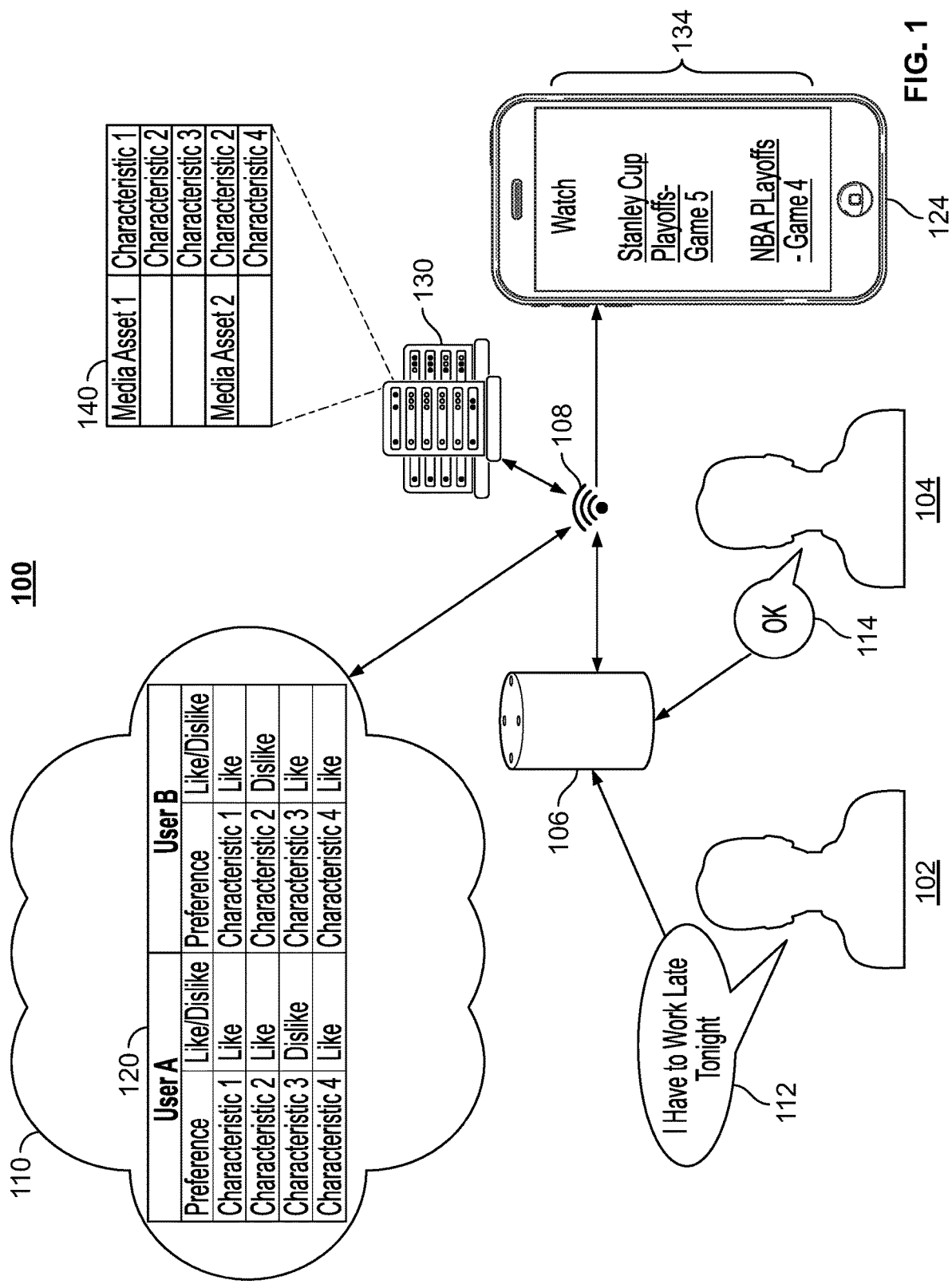
FIG. 1 shows an illustrative example of a scenario for providing media content recommendations, in accordance with some embodiments of the disclosure.

FIG. 1 shows an illustrative example of a scenario 100 for providing media content recommendations 134, in accordance with some embodiments of the disclosure. In scenario 100, a media guidance application may receive an input, via a microphone of a user device 106, of a conversation between a first user 102 and a second user 104. In some embodiments, the user device 106 may be in operative communication via a network 108 with a database 120 stored in a cloud storage environment 110, a database 140 stored in an on-site server 130 at a content source, and a media device 124. While the database 120 and the database 140 are shown in FIG. 1 to be stored in the cloud storage environment 110 and the on-site server 130, respectively, those skilled in the art will recognize that the database 120 and/or the database 140 may be stored in any applicable storage environment known to those skilled in the art, and that the examples shown in FIG. 1 are merely for illustrative purposes. For example, the media guidance application may receive audio via a passive microphone (e.g., a microphone that is always listening without a user first having to activate the microphone) or an active microphone (e.g., a microphone that receives audio only when a user activates the microphone, such as by pressing a button). In some embodiments, scenario 100 may include multiple user devices 106, each with one or more microphones, in multiple locations, and the media guidance application may receive the audio from the one or more microphones of the multiple user devices 106. The media guidance application may process the received audio to determine that the audio includes a conversation between the first user 102 and the second user 104. For example, the media guidance application may perform digital signal processing including frequency analysis, waveform matching, audio hashing, perceptual hashing, and/or any other digital signal processing method known to those skilled in the art for determining whether audio includes a conversation. In some embodiments, the media guidance application may receive audio via an electronic communications device (such as a telephone for a telephonic conversation, and/or a computer, a smartphone, a tablet, a smart watch, and/or any other mobile computing device for an audio or video conference between the first user 102 and the second user 104. For example, the media guidance application may receive audio from an electronic communications device of the first user 102, e.g., a smartphone engaged in a video conference, by extracting an audio portion of the video conference, and process the audio, as described further below.

In some embodiments, the media guidance application may detect a phrase 112 spoken by the first user 102 in the conversation. For example, the media guidance application may perform the same and/or additional digital signal processing methods described above to detect the phrase 112 spoken by the first user 102 in the conversation. The media guidance application may further detect a phrase 114 spoken by the second user 104 in the conversation. In an illustrative embodiment, the media guidance application may process the received audio input to detect that the first user 102 has spoken the words "I have to work late tonight" in a conversation with the second user 104, and may further detect that the second user 104 has said "OK" in response to the first user 102.

In some embodiments, the media guidance application may determine that a given audio template of a plurality of audio templates matches the phrase 112. For example, the media guidance application may compare the phrase 112 spoken by the first user 102 in the conversation to a plurality of audio templates to determine whether the phrase 112 matches a given audio template. In the illustrative embodiment, the media guidance application may compare the words "I have to work late tonight" to audio templates of phrases to determine if the words match a given audio template.

In some embodiments, the media guidance application may generate an audio signature corresponding to the phrase 112. For example, the media guidance application may perform digital signal processing including frequency analysis, peak volume detecting, audio hashing, waveform matching, and/or any other digital signal processing method known to those skilled in the art for generating an audio signature corresponding to a phrase 112. In the illustrative embodiment, the media guidance application may generate an audio signature corresponding to the words "I have to work late tonight" spoken by the first user 102.

In some embodiments, the media guidance application may retrieve, from a database, a plurality of audio signatures corresponding to the plurality of audio templates. For example, the media guidance application may send a query to a database storing audio signatures for audio signatures corresponding to the plurality of audio templates. The media guidance application may then receive, from the database, in response to the query, the plurality of audio signatures corresponding to the plurality of audio templates.

In some embodiments, the media guidance application may compare the generated audio signature to each of the plurality of audio signatures corresponding to the plurality of audio templates. For example, the media guidance application may compare the audio signature corresponding to the phrase 112 with the plurality of audio signatures retrieved from the database to determine if the generated audio signature matches a given audio signature of the plurality of audio signatures. In the illustrative embodiment, the media guidance application may determine that the audio signature corresponding to the words "I have to work late tonight" matches a given audio signature corresponding to a given audio template.

In some embodiments, the media guidance application may determine that the given audio template indicates that the first user 102 will not be consuming media content with the second user 104 during a future time interval. For example, the media guidance application may determine a meaning of the phrase 112 based on the given audio template, and may further determine that the meaning of the phrase 112 indicates that the first user 102 will be absent during a future time interval when the second user 104 intends to consume media. In the illustrative embodiment, the media guidance application may determine that the first user 102 will be working late, and will therefore be absent, that night when the second user 104 intends to consume media.

In some embodiments, the media guidance application may identify a plurality of keywords corresponding to the given audio template. For example, the media guidance application may retrieve metadata associated with the given audio template, and may extract, from the metadata, a plurality of keywords corresponding to the audio template. In the illustrative embodiment, the media guidance application may determine that keywords such as "absent" and "that night" correspond to the given audio template.

In some embodiments, the media guidance application may determine that the plurality of keywords indicate a meaning of the phrase 112. For example, the media guidance application may identify a meaning of the phrase 112 based on a meaning and/or a context of the keywords. In the illustrative embodiment, the media guidance application may determine that a meaning and/or a context associated with the keywords "absent" and "that night" indicate a meaning of the words "I have to work late tonight."

In some embodiments, the media guidance application may determine that the meaning of the phrase 112 indicates that the first user 102 will not be consuming media content with the second user 104 during the future time interval. For example, the media guidance application may determine that the meaning and/or context of the phrase 112 indicates that the first user 102 will be absent during the future time interval, and thus the second user 104 will be consuming media without the first user 102 during the future time interval. In the illustrative embodiment, the media guidance application may determine that the words "I have to work late tonight" mean that the first user 102 will be absent that night, and may further determine, based on a media consumption history and/or media consumption schedule of the second user 104, that the second user 104 will be consuming media content without the first user 102 that night.

In some embodiments, the media guidance application may identify a subset of media asset identifiers from a plurality of media asset identifiers for media assets available for consumption during the future time interval, of which a characteristic of each media asset corresponding to each media asset identifier in the subset matches a characteristic favored by the second user 104 and a characteristic disfavored by the first user 102. For example, the media guidance application may identify the future time interval based on the meaning of the phrase 112, and may then identify a plurality of media assets available for consumption during the future time interval. For example, the media guidance application may query a database 140 for media assets available for consumption during the future time interval, and may then receive, from the database 140, a plurality of media asset identifiers for media assets available for consumption during the future time interval. In the illustrative embodiment, the media guidance application may determine from the words "I have to work late tonight" that the future time interval is that night, and may then query the database 140 for media assets available for consumption that night and receive, in response, a plurality of identifiers (e.g., titles, links, metadata, graphics, video trailers, synopses, etc.) for media assets available for consumption that night.

In some embodiments, the media guidance application may receive, from the database 140, a characteristic of each of the plurality of media assets. For example, the media guidance application may query the database 140 for characteristics of each of the media assets available for consumption during the future time interval, and may receive, in response, one or more characteristics of each of the media assets. The characteristics of the media assets may include a type, a genre, a classification, an artist, a director, a composer, a performer, a rating, a content description, a team, and/or any other characteristic of media assets known to those skilled in the art. In the illustrative embodiment, the media guidance application may query the database 140 for characteristics of media assets that are available for consumption that night, and may receive, from the database 140, characteristics of each of the media assets.

In some embodiments, the media guidance application may retrieve, from a database 120, a user profile of the second user 104. For example, the media guidance application may query the database 120 for a user profile of the second user 104, and may receive from the database 120, in response to the query, the user profile of the second user 104. The user profile may include information about the second user 104, such as user preferences including favored media characteristics and disfavored media characteristics, demographic information, a media consumption history, a media consumption schedule, etc.

In some embodiments, the media guidance application may extract, from the user profile of the second user 104, a characteristic favored by the second user 104. For example, the media guidance application may analyze the user profile of the second user 104 and retrieve, from the user profile, a characteristic favored by the second user 104. In the illustrative embodiment, the media guidance application may extract from the user profile of the second user 104 a preference for hockey.

In some embodiments, the media guidance application may compare the characteristic of each of the plurality of media assets available for consumption during the future time interval with the characteristic favored by the second user 104. For example, the media guidance application may compare the characteristics of the media assets with the characteristic favored by the second user 104 to determine if any of the characteristics matches. In the illustrative embodiment, the media guidance application may determine whether any of the media assets has a characteristic matching the second user's 104 preference for hockey.

In some embodiments, the media guidance application may identify a second subset of media asset identifiers including media asset identifiers for each of the plurality of media assets having a characteristic that matches the characteristic favored by the second user 104. For example, the media guidance application may select, from the media asset identifiers corresponding to media assets available for consumption during the future time interval, a plurality of media asset identifiers corresponding to media assets having a characteristic that matches the characteristic favored by the second user 104. In the illustrative embodiment, the media guidance application may select, from the media assets available for consumption during the future time interval, media asset identifiers corresponding to the media assets having a characteristic matching hockey.

In some embodiments, the media guidance application may retrieve, from the database 120, a user profile of the first user 102. For example, the media guidance application may query the database 120 for a user profile of the first user 102, and may receive from the database 120, in response to the query, the user profile of the first user 102. The user profile may include information about the first user 102, such as user preferences including favored media characteristics and disfavored media characteristics, demographic information, a media consumption history, a media consumption schedule, etc.

In some embodiments, the media guidance application may extract, from the user profile of the first user 102, a characteristic disfavored by the first user 102. For example, the media guidance application may analyze the user profile of the first user 102 and retrieve, from the user profile, a characteristic disfavored by the first user 102. In the illustrative embodiment, the media guidance application may extract from the user profile of the first user 102 a dislike for sports.

In some embodiments, the media guidance application may compare the characteristic of each of the plurality of media assets corresponding to the media asset identifiers included in the second subset of media asset identifiers with the characteristic disfavored by the first user 102. For example, the media guidance application may compare the characteristics of the media assets with the characteristic disfavored by the first user 102 to determine if any of the characteristics matches. In the illustrative embodiment, the media guidance application may determine whether any of the media assets has a characteristic matching the first user's 102 dislike for sports.

In some embodiments, the media guidance application may select, for inclusion in the first subset of media asset identifiers, media asset identifiers included in the second subset of media asset identifiers for media assets having a characteristic that matches the characteristic disfavored by the first user 102. For example, the media guidance application may select, for inclusion in the first subset, the identifiers for media assets having a characteristic matching the characteristic disfavored by the first user 102. In the illustrative embodiment, the media guidance application may select, for inclusion in the first subset, identifiers for media assets having a characteristic matching sports.

In some embodiments, the media guidance application may identify a third subset of media asset identifiers including media asset identifiers for each of the plurality of media assets having a characteristic that matches the characteristic disfavored by the first user 102. For example, the media guidance application may select, from the media asset identifiers corresponding to media assets available for consumption during the future time interval, a plurality of media asset identifiers corresponding to media assets having a characteristic that matches the characteristic disfavored by the first user 102. In the illustrative embodiment, the media guidance application may select, from the media assets available for consumption during the future time interval, media asset identifiers corresponding to the media assets having a characteristic matching sports.

In some embodiments, the media guidance application may select, for inclusion in the first subset of media asset identifiers, media asset identifiers included in both the second subset of media asset identifiers and the third subset of media asset identifiers. For example, the media guidance application may select, for inclusion in the first subset, the identifiers for media assets having a characteristic matching the characteristic favored by the second user 104 and matching the characteristic disfavored by the first user 102. In the illustrative embodiment, the media guidance application may select, for inclusion in the first subset, identifiers for media assets having a characteristic matching hockey and a characteristic matching sports.

In some embodiments, the media guidance application may determine a degree of matching of the characteristic of each of the media assets corresponding to media asset identifiers included in the subset of media asset identifiers to the characteristic favored by the second user 104. For example, the media guidance application may compare the media asset characteristic of each of the media assets corresponding to media asset identifiers included in the subset with the media asset characteristic favored by the second user 104, and may determine a degree of matching of the characteristic of the media assets to the characteristic favored by the second user 104. In the illustrative embodiment, the media guidance application may compare the characteristics of each of the media assets with the second user's 104 preference for hockey, and may determine that a hockey game (e.g., a Stanley Cup playoff game) has a higher degree of matching than a talk show discussing the hockey game, or a newscast reporting a result of the hockey game.

In some embodiments, the media guidance application may generate a list of the plurality of media assets corresponding to media asset identifiers included in the subset. For example, the media guidance application may select all the media asset identifiers included in the subset, and may generate a list including all the selected identifiers.

In some embodiments, the media guidance application may order the list according to the degree of matching. For example, the media guidance application may order the list of media asset identifiers such that media asset identifiers having a characteristic with a higher degree of matching to the characteristic favored by the second user 104 are listed before media asset identifiers having a characteristic with a lower degree of matching to the characteristic favored by the second user 104. In the illustrative embodiment, the media guidance application may list the hockey game first, the talk show discussing the hockey game second, and the newscast reporting the result of the hockey game third.

In some embodiments, the media guidance application may generate, for the future time interval, a media content recommendation 134 of a media asset corresponding to a media asset identifier included in the subset. For example, the media guidance application may select one of the media assets corresponding to a media asset identifier included in the subset, and may generate a recommendation 134 for the second user 104 to consume the selected media asset during the future time interval. In the illustrative embodiment, the media guidance application may generate a recommendation 134 for the second user 104 to watch the hockey game that night.

In some embodiments, the media guidance application may select, from the list, the media asset identifier of a media asset having a characteristic with the highest degree of matching as the media asset for the media content recommendation 134. For example, the media guidance application may select the media asset corresponding to the media asset identifier listed first. In the illustrative embodiment, the media guidance application may select the hockey game for the media content recommendation 134 since the media guidance application determined that the hockey game has the highest degree of matching to the second user's 104 preference for hockey.

In some embodiments, the media guidance application may compare a plurality of characteristics disfavored by the first user 102 to a plurality of characteristics favored by the second user 104. For example, the media guidance application may extract, from the user profile of the first user 102, a plurality of characteristics disfavored by the first user 102. Likewise, the media guidance application may extract, from the user profile of the second user 104, a plurality of characteristics favored by the second user 104. The media guidance application may then compare the plurality of characteristics disfavored by the first user 102 to the plurality of characteristics favored by the second user 104. In the illustrative embodiment, the media guidance application may extract, from the user profile of the first user 102, preferences of the first user 102 indicating that the first user 102 dislikes sports, violent films/television shows, and science fiction. The media guidance application may further extract, from the user profile of the second user 104, preferences of the second user 104 indicating that the second user 104 favors hockey, basketball, action films, and science fiction. The media guidance application may then compare the characteristics disfavored by the first user 102 (i.e., sports, violent films/television shows, and science fiction) to the characteristics favored by the second user 104 (i.e., hockey, basketball, action films, and science fiction).

In some embodiments, the media guidance application may determine that a given characteristic is one of both the plurality of characteristics disfavored by the first user 102 and the plurality of characteristics favored by the second user 104. For example, the media guidance application may determine that a given characteristic is disfavored by the first user 102 and favored by the second user 104. In the illustrative embodiment, the media guidance application may determine that the characteristic science fiction is disfavored by the first user 102 and favored by the second user 104.

In some embodiments, the media guidance application may select, from the media asset identifiers included in the subset of media asset identifiers, a media asset identifier for a media asset having the given characteristic as the media asset for the media content recommendation 134. For example, the media guidance application may select a media asset having the characteristic that is both disfavored by the first user 102 and favored by the second user 104 for the media content recommendation 134. In the illustrative embodiment, the media guidance application may select a media asset having the science fiction characteristic for the media content recommendation 134.

In some embodiments, the media guidance application may generate for display, to the second user 104 via a media device 124, the media content recommendation 134. For example, the media guidance application may generate a notification, message, alert, etc., including text, graphics, videos, links, etc., for the media content recommendation 134. In the illustrative embodiment, the media guidance application may generate a message with links to the hockey game for the media content recommendation 134.

In some embodiments, the first user 102 and the second user 104 may consume media content together, and the media guidance application may generate for display, to the first user 102 and the second user 104, a plurality of media content recommendations 134 based on characteristic that are favored by the first user 102 or the second user 104. The media guidance application may further track, such as by storing data in the user profile of the first user 102, the user profile of the second user 104, the database 120, and/or the database 140, which of the media content recommendations 134 are selected for consumption by the first user 102 and the second user 104 when the first user 102 and the second user 104 consume media content together. For example, the media guidance application may keep a record of media assets consumed when the first user 102 and the second user 104 consume media content together, and may further keep a record of whether the characteristics of the consumed media assets matched characteristics favored by the first user 102 and/or the second user 104.

In some embodiments, the media guidance application may generate for display a media content recommendation 134 based on whether a previous media asset consumed when the first user 102 and the second user 104 consumed media content together matched a characteristic favored by the first user 102 or the second user 104. For example, the media guidance application may determine that the previous media asset consumed when the first user 102 and the second user 104 consumed media content together matched a characteristic favored by the first user 102, and generate the media content recommendation 134 for a media asset having a characteristic matching a characteristic favored by the second user. In an illustrative embodiment, the first user 102 may select a media asset to consume one night, and then the next night the media guidance application may then generate for display a media content recommendation 134 for a media asset having a characteristic favored by the second user 104.

In some embodiments, the media guidance application may generate for display, along with a media content recommendation 134, a notification or alert indicating which of the first user 102 or the second user 104 last selected a media asset to consume when the first user 102 and the second user 104 consumed media content together. For example, the media guidance application may generate a notification with the media content recommendation 134 indicating that the media asset consumed, when the first user 102 and the second user 104 last consumed media content together, had a characteristic favored by the first user 102 and suggest selecting a media asset having a characteristic favored by the second user 104 now.

In some embodiments, the media guidance application may generate for display, to the second user 104 via the media device 124, the media content recommendation 134 at the future time interval. For example, the media guidance application may generate the media content recommendation 134 for display to the second user 104 at the future time interval. In the illustrative embodiment, the media guidance application generates the recommendation 134 for the second user 104 to watch the hockey game that night.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
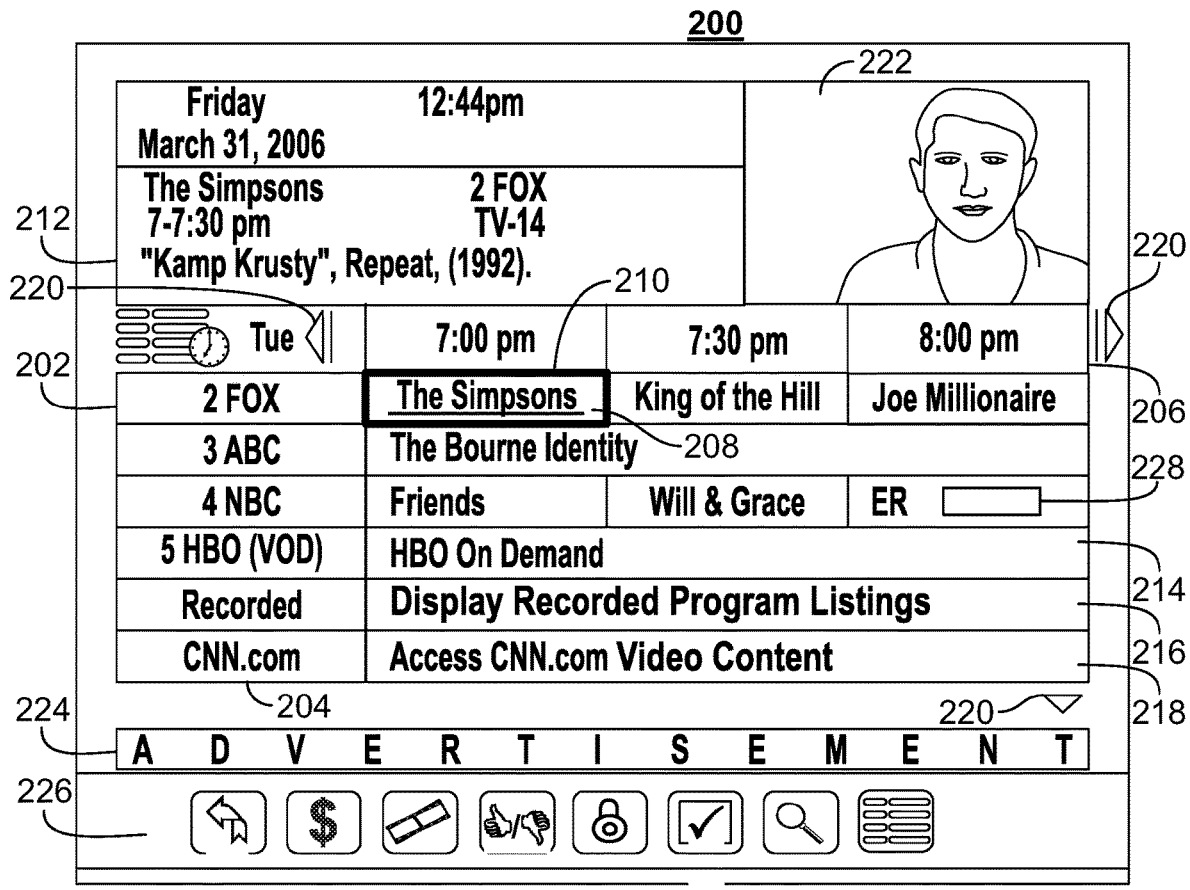
FIGS. 2 and 3 show illustrative examples of display screens generated by a media guidance application in accordance with some embodiments of the disclosure.
Figure 3:
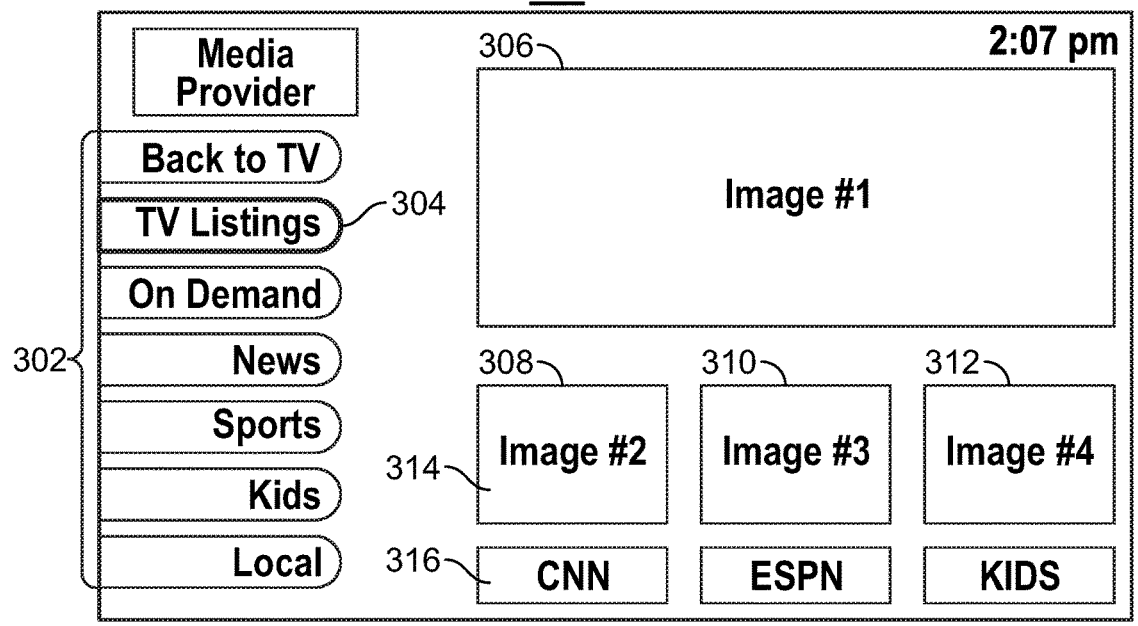

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
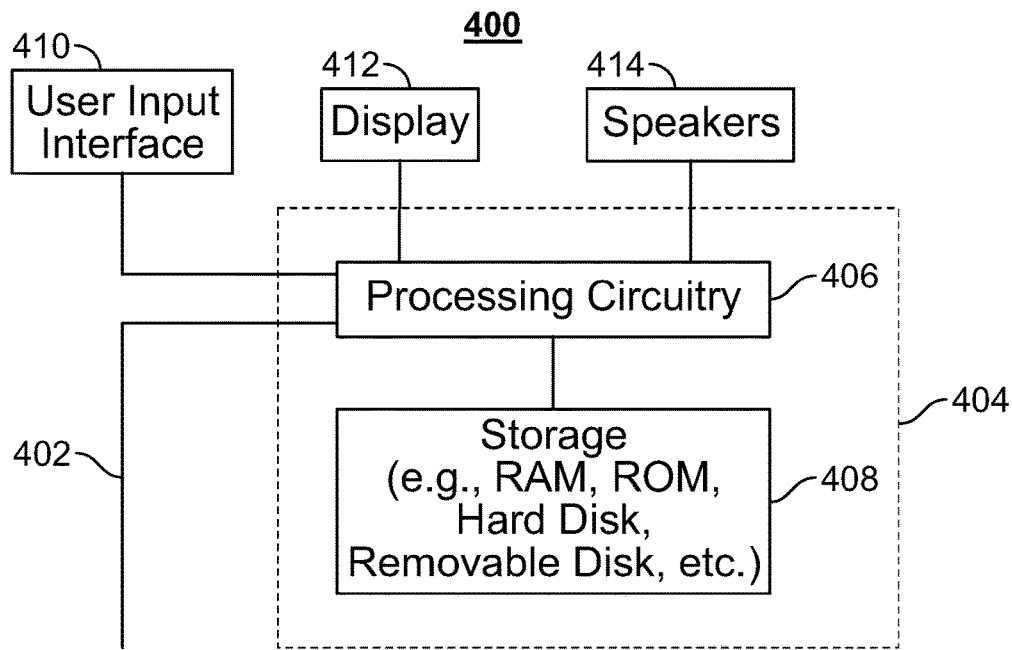
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
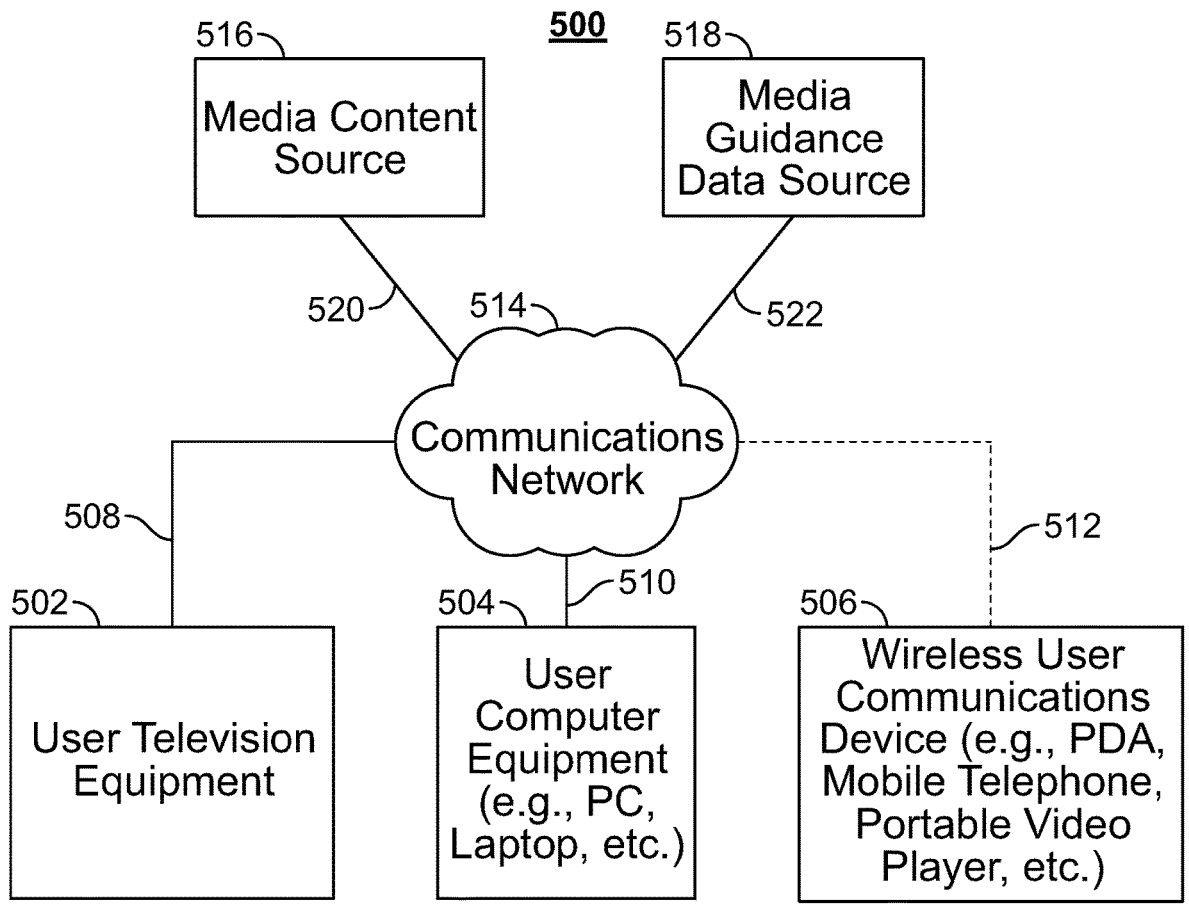
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having a content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
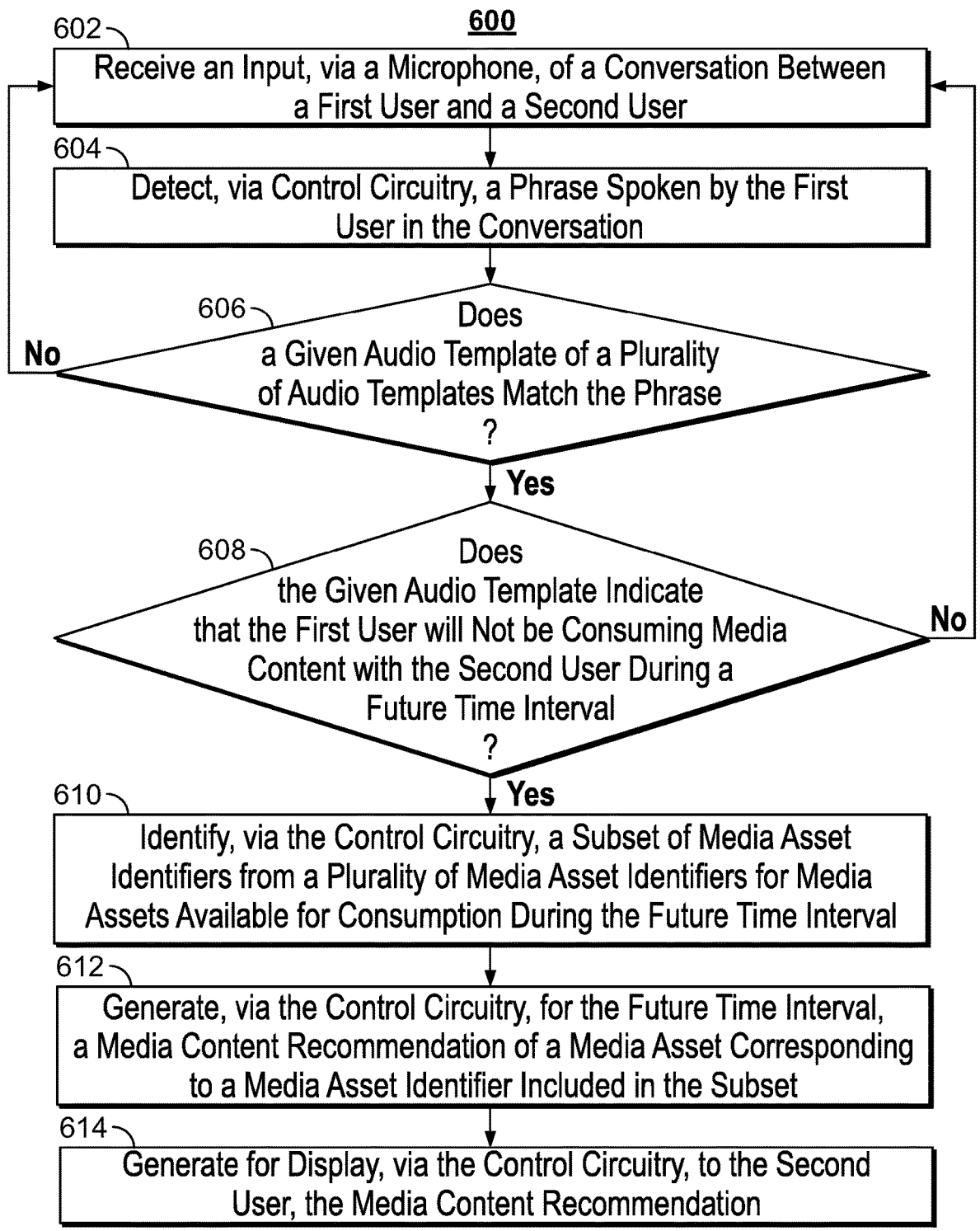
FIG. 6 is a flowchart of an illustrative process for providing media asset recommendations, in accordance with some embodiments of the disclosure.

FIG. 6 is a flowchart of an illustrative process for providing media content recommendations, in accordance with some embodiments of the disclosure. It should be noted that process 600 or any step thereof could be performed on, or provided by, any of the devices shown in FIGS. 1, 4, and 5. For example, process 600 may be executed by control circuitry 404 (FIG. 4) as instructed by a media guidance application implemented on user device 106 (which may have the functionality of any or all of user equipment 502, 504, and/or 506 (FIG. 5)). In addition, one or more steps of process 600 may be incorporated into or combined with one or more steps of any other process or embodiment (e.g., as described in relation to FIGS. 7-12). Many elements of process 600 have been described above with respect to FIG. 1, and those descriptions have full force and effect with respect to the below description of process 600, and thus details on previously described elements are omitted for the sake of brevity.

At 602, control circuitry 404 receives an input, via one or more microphones (e.g., user input interface 410) of a user device 106, of a conversation between a first user 102 and a second user 104. For example, control circuitry 404 may receive audio via a passive microphone (e.g., a microphone that is always listening without a user first having to activate the microphone) or an active microphone (e.g., a microphone that receives audio only when a user activates the microphone, such as by pressing a button). Control circuitry 404 may process (e.g., via processing circuitry 406) the received audio to determine that the audio includes a conversation between the first user 102 and the second user 104. For example, control circuitry 404 may perform (e.g., via processing circuitry 406) digital signal processing including frequency analysis, waveform matching, audio hashing, perceptual hashing, and/or any other digital signal processing method known to those skilled in the art for determining whether audio includes a conversation.

At 604, control circuitry 404 detects (e.g., via processing circuitry 406) a phrase 112 spoken by the first user 102 in the conversation. For example, control circuitry 404 may perform (e.g., via processing circuitry 406) the same and/or additional digital signal processing methods described above to detect the phrase 112 spoken by the first user 102 in the conversation. Control circuitry 404 may further detect (e.g., via processing circuitry 406) a phrase 114 spoken by the second user 104 in the conversation. In an illustrative embodiment, control circuitry 404 may process (e.g., via processing circuitry 406) the received audio input to detect that the first user 102 has spoken the words "I have to work late tonight" in a conversation with the second user 104, and may further detect (e.g., via processing circuitry 406) that the second user 104 has said "OK" in response to the first user 102.

At 606, control circuitry 404 determines (e.g., via processing circuitry 406) whether a given audio template of a plurality of audio templates matches the phrase 112. For example, control circuitry 404 may compare (e.g., via processing circuitry 406) the phrase 112 spoken by the first user 102 in the conversation to a plurality of audio templates to determine whether the phrase 112 matches a given audio template. In the illustrative embodiment, control circuitry 404 may compare (e.g., via processing circuitry 406) the words "I have to work late tonight" to audio templates of phrases to determine if the words match a given audio template. In response to determining that the given audio template does not match the phrase, process 600 returns to step 602. In response to determining that the given audio template matches the phrase, process 600 proceeds to step 608.

At 608, control circuitry 404 determines (e.g., via processing circuitry 406) whether the given audio template indicates that the first user 102 will not be consuming media content with the second user 104 during a future time interval. For example, control circuitry 404 may determine (e.g., via processing circuitry 406) a meaning of the phrase 112 based on the given audio template, and may further determine that the meaning of the phrase 112 indicates that the first user 102 will be absent during a future time interval when the second user 104 intends to consume media. In the illustrative embodiment, control circuitry 404 may determine (e.g., via processing circuitry 406) that the first user 102 will be working late, and will therefore be absent, that night when the second user 104 intends to consume media. In response to determining that the given audio template indicates that the first user will be consuming media content with the second user during the future time interval, process 600 returns to step 602. In response to determining that the given audio template indicates that the first user will not be consuming media content with the second user during the future time interval, process 600 proceeds to step 610.

At 610, control circuitry 404 identifies (e.g., via processing circuitry 406) a subset of media asset identifiers from a plurality of media asset identifiers for media assets available for consumption during the future time interval, of which a characteristic of each media asset corresponding to each media asset identifier in the subset matches a characteristic favored by the second user 104 and a characteristic disfavored by the first user 102. For example, control circuitry 404 may identify (e.g., via processing circuitry 406) the future time interval based on the meaning of the phrase 112, and may then identify (e.g., via processing circuitry 406) a plurality of media assets available for consumption during the future time interval. For example, control circuitry 404 may query a database 140 for media assets available for consumption during the future time interval, and may then receive, from the database 140, a plurality of media asset identifiers for media assets available for consumption during the future time interval. In the illustrative embodiment, control circuitry 404 may determine (e.g., via processing circuitry 406) from the words "I have to work late tonight"

that the future time interval is that night, and may then query the database 140 for media assets available for consumption that night and receive, in response, a plurality of identifiers (e.g., titles, links, metadata, graphics, video trailers, synopses, etc.) for media assets available for consumption that night.

At 612, control circuitry 404 generates (e.g., via processing circuitry 406), for the future time interval, a media content recommendation 134 of a media asset corresponding to a media asset identifier included in the subset. For example, control circuitry 404 may select (e.g., via processing circuitry 406) one of the media assets corresponding to a media asset identifier included in the subset, and may generate a recommendation 134 for the second user 104 to consume the selected media asset during the future time interval. In the illustrative embodiment, control circuitry 404 may generate (e.g., via processing circuitry 406) a recommendation 134 for the second user 104 to watch the hockey game that night.

At 614, control circuitry 404 generates for display (e.g., via processing circuitry 406), to the second user 104 via a media device 124, the media content recommendation 134. For example, control circuitry 404 may generate (e.g., via processing circuitry 406) a notification, message, alert, etc., including text, graphics, videos, links, etc., for the media content recommendation 134. In the illustrative embodiment, control circuitry 404 may generate (e.g., via processing circuitry 406) a message with links to the hockey game for the media content recommendation 134. In some embodiments, control circuitry 404 may generate for display (e.g., via processing circuitry 406), to the second user 104 via the media device 124, the media content recommendation 134 at the future time interval. For example, control circuitry 404 may generate (e.g., via processing circuitry 406) the media content recommendation 134 for display to the second user 104 at the future time interval. In the illustrative embodiment, control circuitry 404 generates (e.g., via processing circuitry 406) the recommendation 134 for the second user 104 to watch the hockey game that night.

FIG. 7 is a flowchart of a detailed illustrative process for determining that a given audio template of a plurality of audio templates matches a phrase, in accordance with some embodiments of the disclosure. It should be noted that process 700 or any step thereof could be performed on, or provided by, any of the devices shown in FIGS. 1, 4, and 5. For example, process 700 may be executed by control circuitry 404 (FIG. 4) as instructed by a media guidance application implemented on user device 106 (which may have the functionality of any or all of user equipment 502, 504, and/or 506 (FIG. 5)). In addition, one or more steps of process 700 may be incorporated into or combined with one or more steps of any other process or embodiment (e.g., as described in relation to FIGS. 6 and 8-12). Many elements of process 700 have been described above with respect to FIG. 1, and those descriptions have full force and effect with respect to the below description of process 700, and thus details on previously described elements are omitted for the sake of brevity.

At 702, control circuitry 404 begins a subroutine for determining that a given audio template of a plurality of audio templates matches a phrase.

At 704, control circuitry 404 generates (e.g., via processing circuitry 406 and storage 408) an audio signature corresponding to the phrase 112. For example, control circuitry 404 may perform (e.g., via processing circuitry 406) digital signal processing including frequency analysis, peak volume detecting, audio hashing, waveform matching, and/or any other digital signal processing method known to those skilled in the art for generating an audio signature corresponding to a phrase 112. In the illustrative embodiment, control circuitry 404 may generate (e.g., via processing circuitry 406 and storage 408) an audio signature corresponding to the words "I have to work late tonight" spoken by the first user 102.

At 706, control circuitry 404 retrieves, from a database, a plurality of audio signatures corresponding to the plurality of audio templates. For example, control circuitry 404 may send a query to a database storing audio signatures for audio signatures corresponding to the plurality of audio templates. Control circuitry 404 may then receive, from the database, in response to the query, the plurality of audio signatures corresponding to the plurality of audio templates.

At 708, control circuitry 404 compares (e.g., via processing circuitry 406) the generated audio signature to each of the plurality of audio signatures corresponding to the plurality of audio templates. For example, control circuitry 404 may compare (e.g., via processing circuitry 406) the audio signature corresponding to the phrase 112 with the plurality of audio signatures retrieved from the database to determine if the generated audio signature matches a given audio signature of the plurality of audio signatures. In the illustrative embodiment, control circuitry 404 may determine (e.g., via processing circuitry 406) that the audio signature corresponding to the words "I have to work late tonight" matches a given audio signature corresponding to a given audio template.

Figure 8:
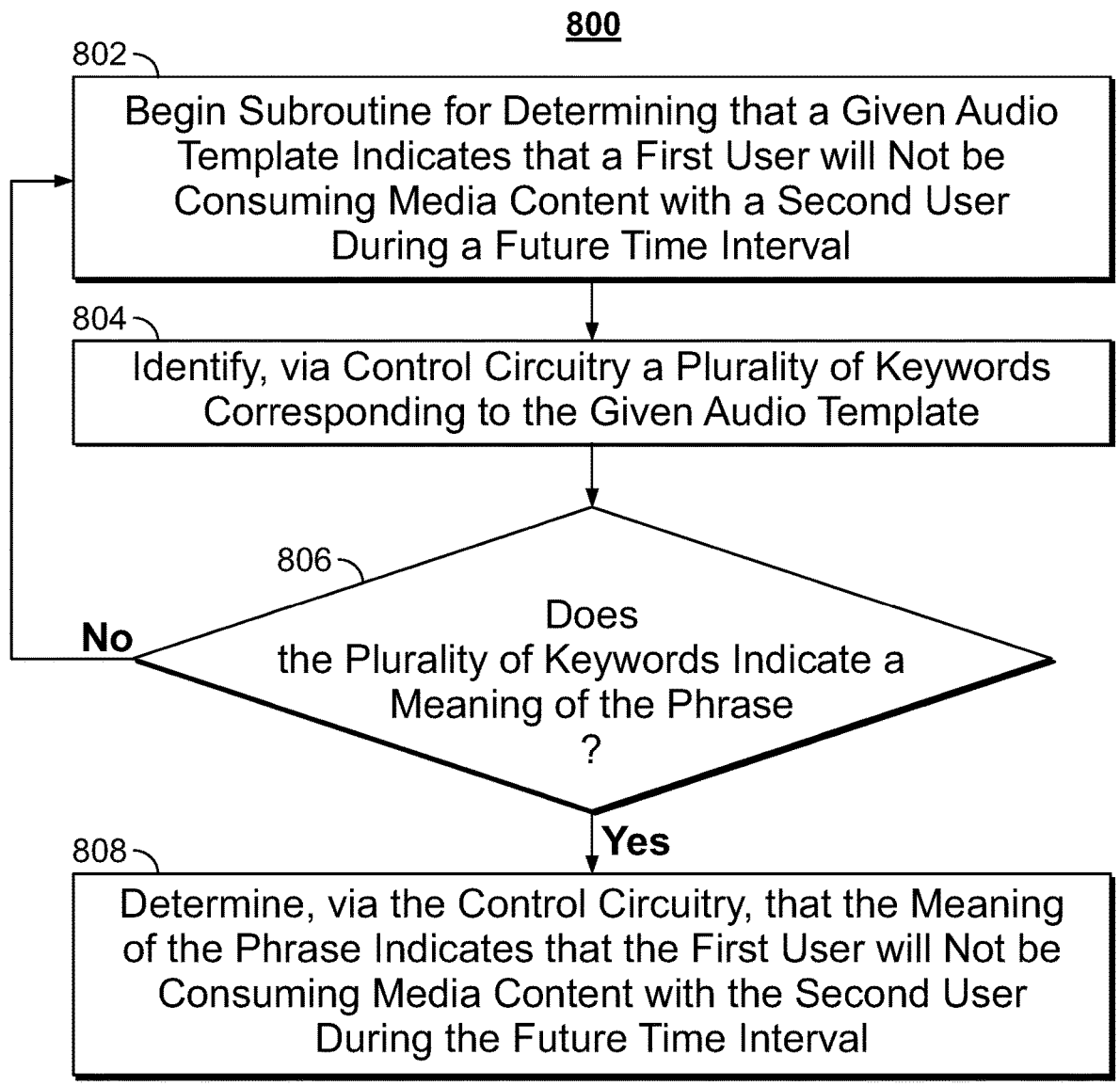
FIG. 8 is a flowchart of a detailed illustrative process for determining that a given audio template indicates that a first user will not be consuming media content with a second user during a future time interval, in accordance with some embodiments of the disclosure.

FIG. 8 is a flowchart of a detailed illustrative process for determining that a given audio template indicates that a first user will not be consuming media content with a second user during a future time interval, in accordance with some embodiments of the disclosure. It should be noted that process 800 or any step thereof could be performed on, or provided by, any of the devices shown in FIGS. 1, 4, and 5. For example, process 800 may be executed by control circuitry 404 (FIG. 4) as instructed by a media guidance application implemented on user device 106 (which may have the functionality of any or all of user equipment 502, 504, and/or 506 (FIG. 5)). In addition, one or more steps of process 800 may be incorporated into or combined with one or more steps of any other process or embodiment (e.g., as described in relation to FIGS. 6, 7, and 9-12). Many elements of process 800 have been described above with respect to FIG. 1, and those descriptions have full force and effect with respect to the below description of process 800, and thus details on previously described elements are omitted for the sake of brevity.

At 802, control circuitry 404 begins a subroutine for determining that a given audio template indicates that a first user will not be consuming media content with a second user during a future time interval.

At 804, control circuitry 404 identifies (e.g., via processing circuitry 406 and storage 408) a plurality of keywords corresponding to the given audio template. For example, control circuitry 404 may retrieve metadata associated with the given audio template, and may extract, from the metadata, a plurality of keywords corresponding to the audio template. In the illustrative embodiment, control circuitry 404 may determine that keywords such as "absent" and "that night" correspond to the given audio template.

At 806, control circuitry 404 determines (e.g., via processing circuitry 406) whether the plurality of keywords indicate a meaning of the phrase 112. For example, control circuitry 404 may identify (e.g., via processing circuitry 406) a meaning of the phrase 112 based on a meaning and/or a context of the keywords. In the illustrative embodiment, control circuitry 404 may determine (e.g., via processing circuitry 406) that a meaning and/or a context associated with the keywords "absent" and "that night" indicate a meaning of the words "I have to work late tonight." In response to determining that the plurality of keywords do not indicate a meaning of the phrase 112, process 800 returns to step 802. In response to determining that the plurality of keywords indicate a meaning of the phrase 112, process 800 proceeds to step 808.

At 808, control circuitry 404 determines (e.g., via processing circuitry 406) that the meaning of the phrase 112 indicates that the first user 102 will not be consuming media content with the second user 104 during the future time interval. For example, control circuitry 404 may determine (e.g., via processing circuitry 406) that the meaning and/or context of the phrase 112 indicates that the first user 102 will be absent during the future time interval, and thus the second user 104 will be consuming media without the first user 102 during the future time interval. In the illustrative embodiment, control circuitry 404 may determine (e.g., via processing circuitry 406) that the words "I have to work late tonight" mean that the first user 102 will be absent that night, and may further determine, based on a media consumption history and/or media consumption schedule of the second user 104, that the second user 104 will be consuming media content without the first user 102 that night.

Figure 9:
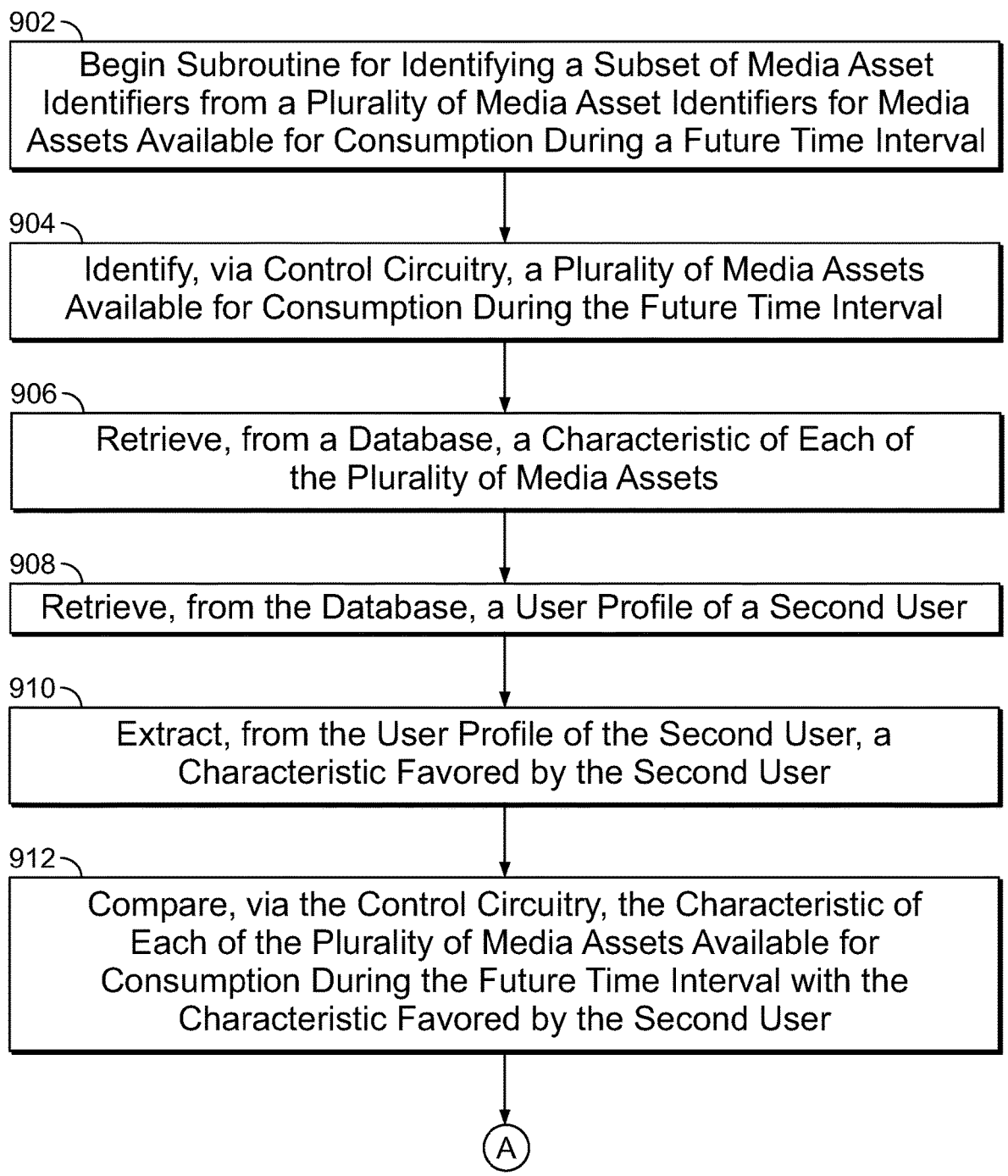
FIG. 9 is a flowchart of a detailed illustrative process for identifying a subset of media asset identifiers from a plurality of media asset identifiers for media assets available for consumption during a future time interval, in accordance with some embodiments of the disclosure.
Figure 9:
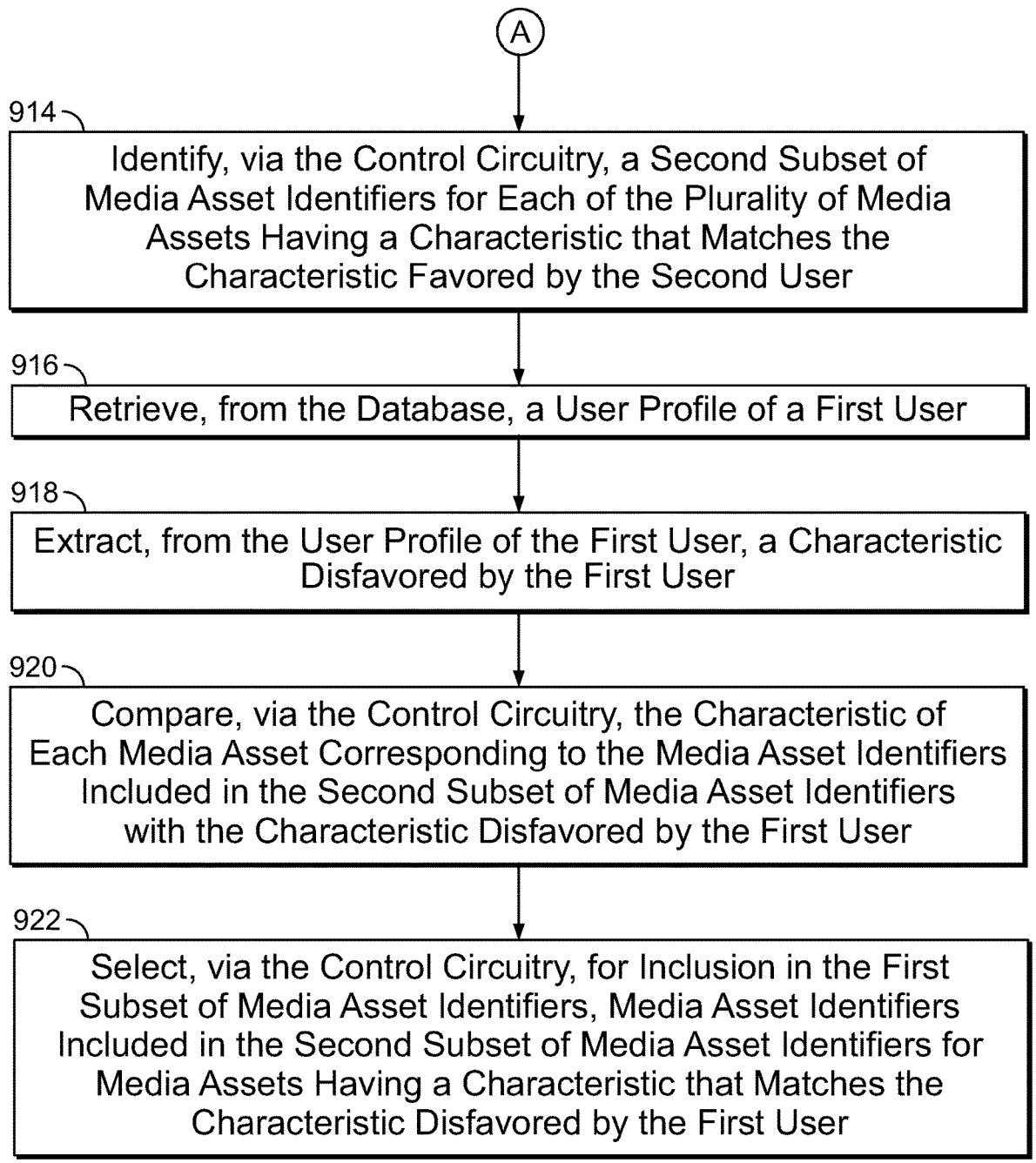

FIG. 9 is a flowchart of a detailed illustrative process for identifying a subset of media asset identifiers from a plurality of media asset identifiers for media assets available for consumption during a future time interval, in accordance with some embodiments of the disclosure. It should be noted that process 900 or any step thereof could be performed on, or provided by, any of the devices shown in FIGS. 1, 4, and 5. For example, process 900 may be executed by control circuitry 404 (FIG. 4) as instructed by a media guidance application implemented on user device 106 (which may have the functionality of any or all of user equipment 502, 504, and/or 506 (FIG. 5)). In addition, one or more steps of process 900 may be incorporated into or combined with one or more steps of any other process or embodiment (e.g., as described in relation to FIGS. 6-8 and 10-12). Many elements of process 900 have been described above with respect to FIG. 1 and those descriptions have full force and effect with respect to the below description of process 900, and thus details on previously-described elements are omitted for the sake of brevity.

At 902, control circuitry 404 begins a subroutine for identifying a subset of media asset identifiers from a plurality of media asset identifiers for media assets available for consumption during a future time interval.

At 904, control circuitry 404 identifies (e.g., via processing circuitry 406) a plurality of media assets available for consumption during the future time interval. For example, control circuitry 404 may query a database 140 for media assets available for consumption during the future time interval, and may then receive, from the database 140, a plurality of media asset identifiers for media assets available for consumption during the future time interval. In the illustrative embodiment, control circuitry 404 may identify (e.g., via processing circuitry 406) media assets available for consumption that night.

At 906, control circuitry 404 retrieves, from the database 140, a characteristic of each of the plurality of media assets. For example, control circuitry 404 may query the database 140 for characteristics of each of the media assets available for consumption during the future time interval, and may receive, in response, one or more characteristics of each of the media assets. The characteristics of the media assets may include a type, a genre, a classification, an artist, a director, a composer, a performer, a rating, a content description, a team, and/or any other characteristic of media assets known to those skilled in the art. In the illustrative embodiment, control circuitry 404 may query the database 140 for characteristics of media assets that are available for consumption that night, and may receive, from the database 140, characteristics of each of the media assets.

At 908, control circuitry 404 retrieves, from a database 120, a user profile of the second user 104. For example, control circuitry 404 may query the database 120 for a user profile of the second user 104, and may receive from the database 120, in response to the query, the user profile of the second user 104. The user profile may include information about the second user 104, such as user preferences including favored media characteristics and disfavored media characteristics, demographic information, a media consumption history, a media consumption schedule, etc.

At 910, control circuitry 404 extracts (e.g., via processing circuitry 406), from the user profile of the second user 104, a characteristic favored by the second user 104. For example, control circuitry 404 may analyze (e.g., via processing circuitry 406) the user profile of the second user 104 and retrieve, from the user profile, a characteristic favored by the second user 104. In the illustrative embodiment, control circuitry 404 may extract (e.g., via processing circuitry 406) from the user profile of the second user 104 a preference for hockey.

At 912, control circuitry 404 compares (e.g., via processing circuitry 406) the characteristic of each of the plurality of media assets available for consumption during the future time interval with the characteristic favored by the second user 104. For example, control circuitry 404 may compare (e.g., via processing circuitry 406) the characteristics of the media assets with the characteristic favored by the second user 104 to determine if any of the characteristics matches. In the illustrative embodiment, control circuitry 404 may determine (e.g., via processing circuitry 406) whether any of the media assets has a characteristic matching the second user's 104 preference for hockey.

At 914, control circuitry 404 identifies (e.g., via processing circuitry 406 and storage 408) a second subset of media asset identifiers including media asset identifiers for each of the plurality of media assets having a characteristic that matches the characteristic favored by the second user 104. For example, control circuitry 404 may select (e.g., via processing circuitry 406), from the media asset identifiers corresponding to media assets available for consumption during the future time interval, a plurality of media asset identifiers corresponding to media assets having a characteristic that matches the characteristic favored by the second user 104. In the illustrative embodiment, control circuitry 404 may select (e.g., via processing circuitry 406), from the media assets available for consumption during the future time interval, media asset identifiers corresponding to the media assets having a characteristic matching hockey.

At 916, control circuitry 404 retrieves, from the database 120, a user profile of the first user 102. For example, control circuitry 404 may query the database 120 for a user profile of the first user 102, and may receive from the database 120, in response to the query, the user profile of the first user 102. The user profile may include information about the first user 102, such as user preferences including favored media characteristics and disfavored media characteristics, demographic information, a media consumption history, a media consumption schedule, etc.

At 918, control circuitry 404 extracts (e.g., via processing circuitry 406), from the user profile of the first user 102, a characteristic disfavored by the first user 102. For example, control circuitry 404 may analyze (e.g., via processing circuitry 406) the user profile of the first user 102 and retrieve, from the user profile, a characteristic disfavored by the first user 102. In the illustrative embodiment, control circuitry 404 may extract (e.g., via processing circuitry 406) from the user profile of the first user 102 a dislike for sports.

At 920, control circuitry 404 compares (e.g., via processing circuitry 406) the characteristic of each of the plurality of media assets corresponding to the media asset identifiers included in the second subset of media asset identifiers with the characteristic disfavored by the first user 102. For example, control circuitry 404 may compare (e.g., via processing circuitry 406) the characteristics of the media assets with the characteristic disfavored by the first user 102 to determine if any of the characteristics matches. In the illustrative embodiment, control circuitry 404 may determine (e.g., via processing circuitry 406) whether any of the media assets has a characteristic matching the first user's 102 dislike for sports.

At 922, control circuitry 404 selects (e.g., via processing circuitry 406), for inclusion in the first subset of media asset identifiers, media asset identifiers included in the second subset of media asset identifiers for media assets having a characteristic that matches the characteristic disfavored by the first user 102. For example, control circuitry 404 may select (e.g., via processing circuitry 406), for inclusion in the first subset, the identifiers for media assets having a characteristic matching the characteristic disfavored by the first user 102. In the illustrative embodiment, control circuitry 404 may select, for inclusion in the first subset, identifiers for media assets having a characteristic matching sports.

Figure 10:
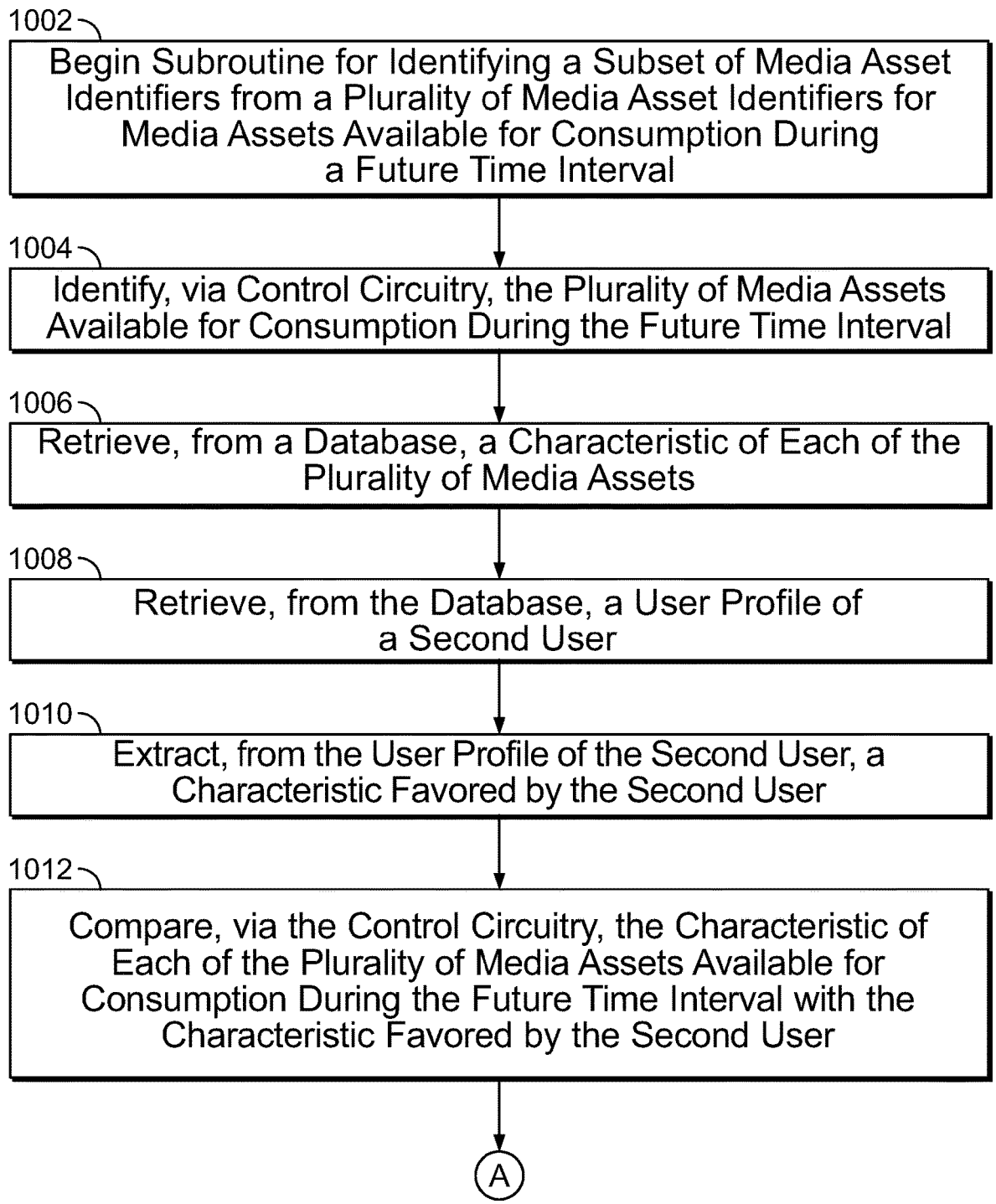
FIG. 10 is a flowchart of another detailed illustrative process for identifying a subset of media asset identifiers from a plurality of media asset identifiers for media assets available for consumption during a future time interval, in accordance with some embodiments of the disclosure.
Figure 10:
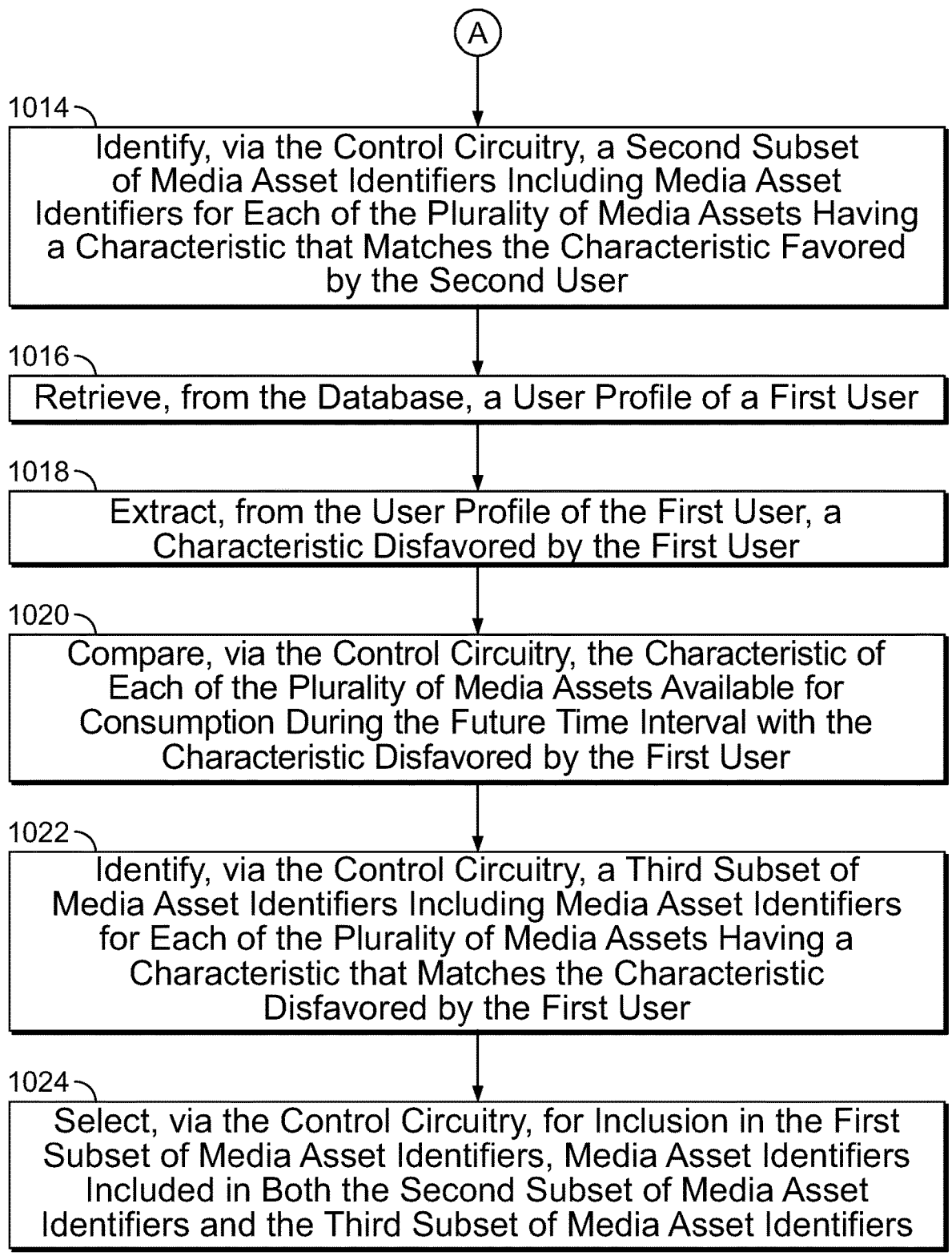

FIG. 10 is a flowchart of a detailed illustrative process for identifying a subset of media asset identifiers from a plurality of media asset identifiers for media assets available for consumption during a future time interval, in accordance with some embodiments of the disclosure. It should be noted that process 1000 or any step thereof could be performed on, or provided by, any of the devices shown in FIGS. 1, 4, and 5. For example, process 1000 may be executed by control circuitry 404 (FIG. 4) as instructed by a media guidance application implemented on user device 106 (which may have the functionality of any or all of user equipment 502, 504, and/or 506 (FIG. 5)). In addition, one or more steps of process 1000 may be incorporated into or combined with one or more steps of any other process or embodiment (e.g., as described in relation to FIGS. 6-9, 11, and 12). Many elements of process 1000 have been described above with respect to FIG. 1, and those descriptions have full force and effect with respect to the below description of process 1000, and thus details on previously-described elements are omitted for the sake of brevity.

At 1002, control circuitry 404 begins a subroutine for identifying a subset of media asset identifiers from a plurality of media asset identifiers for media assets available for consumption during a future time interval.

At 1004, control circuitry 404 identifies (e.g., via processing circuitry 406) a plurality of media assets available for consumption during the future time interval. For example, control circuitry 404 may query a database 140 for media assets available for consumption during the future time interval, and may then receive, from the database 140, a plurality of media asset identifiers for media assets available for consumption during the future time interval. In the illustrative embodiment, control circuitry 404 may identify (e.g., via processing circuitry 406) media assets available for consumption that night.

At 1006, control circuitry 404 retrieves, from the database 140, a characteristic of each of the plurality of media assets. For example, control circuitry 404 may query the database 140 for characteristics of each of the media assets available for consumption during the future time interval, and may receive, in response, one or more characteristics of each of the media assets. The characteristics of the media assets may include a type, a genre, a classification, an artist, a director, a composer, a performer, a rating, a content description, a team, and/or any other characteristic of media assets known to those skilled in the art. In the illustrative embodiment, control circuitry 404 may query the database 140 for characteristics of media assets that are available for consumption that night, and may receive, from the database 140, characteristics of each of the media assets.

At 1008, control circuitry 404 retrieves, from a database 120, a user profile of the second user 104. For example, control circuitry 404 may query the database 120 for a user profile of the second user 104, and may receive from the database 120, in response to the query, the user profile of the second user 104. The user profile may include information about the second user 104, such as user preferences including favored media characteristics and disfavored media characteristics, demographic information, a media consumption history, a media consumption schedule, etc.

At 1010, control circuitry 404 extracts (e.g., via processing circuitry 406), from the user profile of the second user 104, a characteristic favored by the second user 104. For example, control circuitry 404 may analyze (e.g., via processing circuitry 406) the user profile of the second user 104 and retrieve, from the user profile, a characteristic favored by the second user 104. In the illustrative embodiment, control circuitry 404 may extract (e.g., via processing circuitry 406) from the user profile of the second user 104 a preference for hockey.

At 1012, control circuitry 404 compares (e.g., via processing circuitry 406) the characteristic of each of the plurality of media assets available for consumption during the future time interval with the characteristic favored by the second user 104. For example, control circuitry 404 may compare (e.g., via processing circuitry 406) the characteristics of the media assets with the characteristic favored by the second user 104 to determine if any of the characteristics matches. In the illustrative embodiment, control circuitry 404 may determine (e.g., via processing circuitry 406) whether any of the media assets has a characteristic matching the second user's 104 preference for hockey.

At 1014, control circuitry 404 identifies (e.g., via processing circuitry 406 and storage 408) a second subset of media asset identifiers including media asset identifiers for each of the plurality of media assets having a characteristic that matches the characteristic favored by the second user 104. For example, control circuitry 404 may select (e.g., via processing circuitry 406), from the media asset identifiers corresponding to media assets available for consumption during the future time interval, a plurality of media asset identifiers corresponding to media assets having a characteristic that matches the characteristic favored by the second user 104. In the illustrative embodiment, control circuitry 404 may select (e.g., via processing circuitry 406), from the media assets available for consumption during the future time interval, media asset identifiers corresponding to the media assets having a characteristic matching hockey.

At 1016, control circuitry 404 retrieves, from the database 120, a user profile of the first user 102. For example, control circuitry 404 may query the database 120 for a user profile of the first user 102, and may receive from the database 120, in response to the query, the user profile of the first user 102. The user profile may include information about the first user 102, such as user preferences including favored media characteristics and disfavored media characteristics, demographic information, a media consumption history, a media consumption schedule, etc.

At 1018, control circuitry 404 extracts (e.g., via processing circuitry 406), from the user profile of the first user 102, a characteristic disfavored by the first user 102. For example, control circuitry 404 may analyze (e.g., via processing circuitry 406) the user profile of the first user 102 and retrieve, from the user profile, a characteristic disfavored by the first user 102. In the illustrative embodiment, control circuitry 404 may extract (e.g., via processing circuitry 406) from the user profile of the first user 102 a dislike for sports.

At 1020, control circuitry 404 compares (e.g., via processing circuitry 406) the characteristic of each of the plurality of media assets available for consumption during the future time interval with the characteristic disfavored by the first user 102. For example, control circuitry 404 may compare (e.g., via processing circuitry 406) the characteristics of the media assets with the characteristic disfavored by the first user 102 to determine if any of the characteristics matches. In the illustrative embodiment, control circuitry 404 may determine (e.g., via processing circuitry 406) whether any of the media assets has a characteristic matching the first user's 102 dislike for sports.

At 1022, control circuitry 404 identifies (e.g., via processing circuitry 406 and storage 408) a third subset of media asset identifiers including media asset identifiers for each of the plurality of media assets having a characteristic that matches the characteristic disfavored by the first user 102. For example, control circuitry 404 may select (e.g., via processing circuitry 406), from the media asset identifiers corresponding to media assets available for consumption during the future time interval, a plurality of media asset identifiers corresponding to media assets having a characteristic that matches the characteristic disfavored by the first user 102. In the illustrative embodiment, control circuitry 404 may select (e.g., via processing circuitry 406), from the media assets available for consumption during the future time interval, media asset identifiers corresponding to the media assets having a characteristic matching sports.

At 1024, control circuitry 404 selects (e.g., via processing circuitry 406), for inclusion in the first subset of media asset identifiers, media asset identifiers included in both the second subset of media asset identifiers and the third subset of media asset identifiers. For example, control circuitry 404 may select (e.g., via processing circuitry 406), for inclusion in the first subset, the identifiers for media assets having a characteristic matching the characteristic favored by the second user 104 and matching the characteristic disfavored by the first user 102. In the illustrative embodiment, control circuitry 404 may select (e.g., via processing circuitry 406), for inclusion in the first subset, identifiers for media assets having a characteristic matching hockey and a characteristic matching sports.

FIG. 11 is a flowchart of a detailed illustrative process for generating, for a future time interval, a media content recommendation of a media asset corresponding to a media asset identifier included in a subset, in accordance with some embodiments of the disclosure. It should be noted that process 1100 or any step thereof could be performed on, or provided by, any of the devices shown in FIGS. 1, 4, and 5. For example, process 1100 may be executed by control circuitry 404 (FIG. 4) as instructed by a media guidance application implemented on user device 106 (which may have the functionality of any or all of user equipment 502, 504, and/or 506 (FIG. 5)). In addition, one or more steps of process 1100 may be incorporated into or combined with one or more steps of any other process or embodiment (e.g., as described in relation to FIGS. 6-10 and 12). Many elements of process 1100 have been described above with respect to FIG. 1, and those descriptions have full force and effect with respect to the below description of process 1100, and thus details on previously-described elements are omitted for the sake of brevity.

At 1102, control circuitry 404 begins a subroutine for generating, for a future time interval, a media content recommendation of a media asset corresponding to a media asset identifier included in a subset.

At 1104, control circuitry 404 determines (e.g., via processing circuitry 406) a degree of matching of the characteristic of each of the media assets corresponding to media asset identifiers included in the subset of media asset identifiers to the characteristic favored by the second user 104. For example, control circuitry 404 may compare (e.g., via processing circuitry 406) the media asset characteristic of each of the media assets corresponding to media asset identifiers included in the subset with the media asset characteristic favored by the second user 104, and may determine a degree of matching of the characteristic of the media assets to the characteristic favored by the second user 104. In the illustrative embodiment, control circuitry 404 may compare (e.g., via processing circuitry 406) the characteristics of each of the media assets with the second user's 104 preference for hockey, and may determine that a hockey game (e.g., a Stanley Cup playoff game) has a higher degree of matching than a talk show discussing the hockey game, or a newscast reporting a result of the hockey game.

At 1106, control circuitry 404 generates (e.g., via processing circuitry 406 and storage 408) a list of the plurality of media assets corresponding to media asset identifiers included in the subset. For example, control circuitry 404 may select (e.g., via processing circuitry 406) all the media asset identifiers included in the subset, and may generate a list including all the selected identifiers.

At 1108, control circuitry 404 orders (e.g., via processing circuitry 406 and storage 408) the list according to the degree of matching. For example, control circuitry 404 may order (e.g., via processing circuitry 406 and storage 408) the list of media asset identifiers such that media asset identifiers having a characteristic with a higher degree of matching to the characteristic favored by the second user 104 are listed before media asset identifiers having a characteristic with a lower degree of matching to the characteristic favored by the second user 104. In the illustrative embodiment, control circuitry 404 may list the hockey game first, the talk show discussing the hockey game second, and the newscast reporting the result of the hockey game third.

At 1110, control circuitry 404 selects (e.g., via processing circuitry 406), from the list, the media asset identifier of a media asset having a characteristic with the highest degree of matching as the media asset for the media content recommendation 134. For example, control circuitry 404 may select (e.g., via processing circuitry 406) the media asset corresponding to the media asset identifier listed first.

In the illustrative embodiment, control circuitry 404 may select (e.g., via processing circuitry 406) the hockey game for the media content recommendation 134 since control circuitry 404 determined that the hockey game has the highest degree of matching to the second user's 104 preference for hockey.

Figure 12:
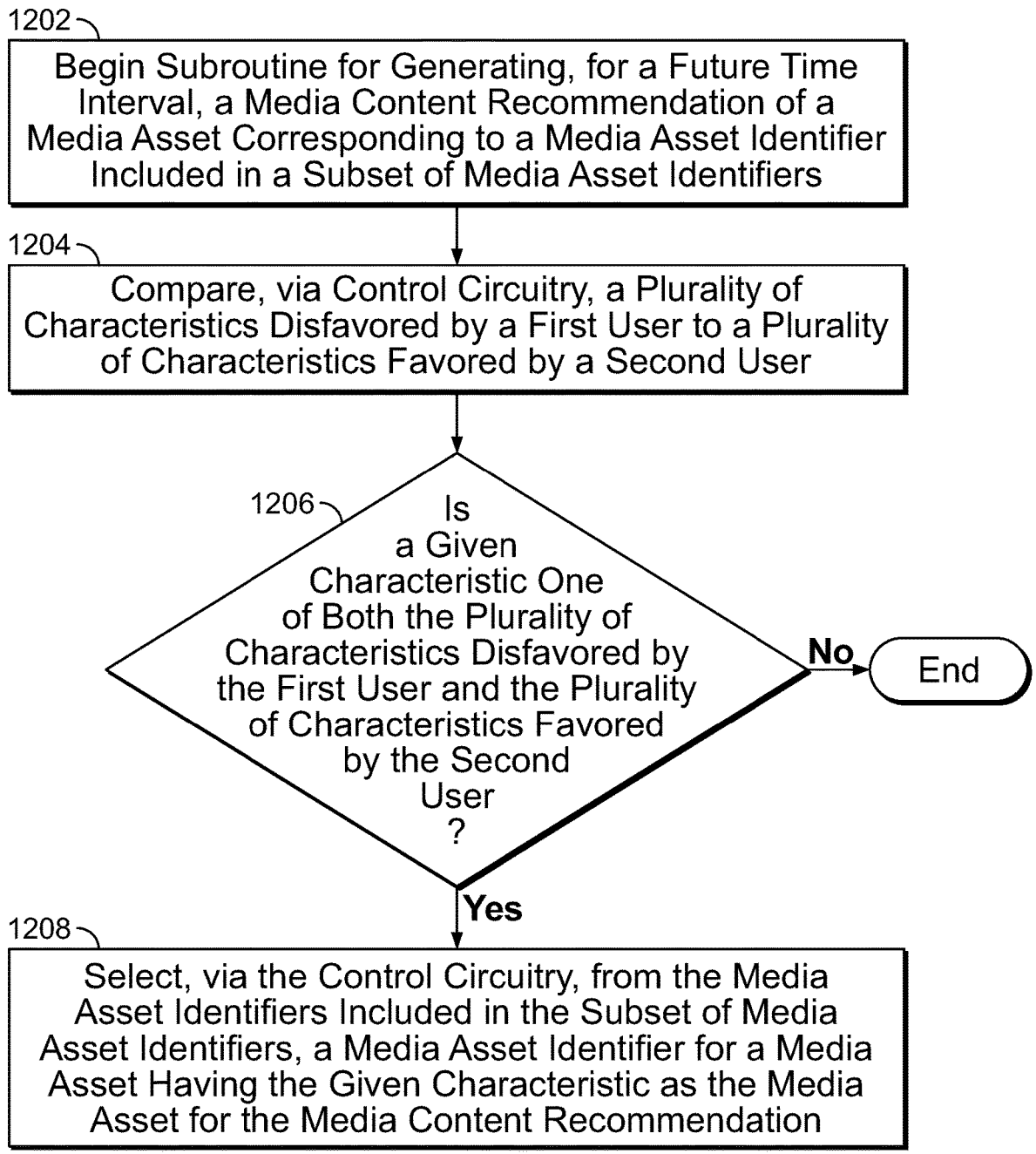
FIG. 12 is a flowchart of an illustrative process for generating a media content recommendation of a media asset corresponding to a media asset identifier included in a subset of media asset identifiers, in accordance with some embodiments of the disclosure.

FIG. 12 is a flowchart of a detailed illustrative process for generating, for a future time interval, a media content recommendation of a media asset corresponding to a media asset identifier included in a subset of media asset identifiers, in accordance with some embodiments of the disclosure. It should be noted that process 1200 or any step thereof could be performed on, or provided by, any of the devices shown in FIGS. 1, 4, and 5. For example, process 1200 may be executed by control circuitry 404 (FIG. 4) as instructed by a media guidance application implemented on user device 106 (which may have the functionality of any or all of user equipment 502, 504, and/or 506 (FIG. 5)). In addition, one or more steps of process 1200 may be incorporated into or combined with one or more steps of any other process or embodiment (e.g., as described in relation to FIGS. 6-11). Many elements of process 1200 have been described above with respect to FIG. 1, and those descriptions have full force and effect with respect to the below description of process 1200, and thus details on previously-described elements are omitted for the sake of brevity.

At 1202, control circuitry 404 begins a subroutine for generating, for a future time interval, a media content recommendation of a media asset corresponding to a media asset identifier included in a subset of media asset identifiers.

At 1204, control circuitry 404 compares (e.g., via processing circuitry 406) a plurality of characteristics disfavored by the first user 102 to a plurality of characteristics favored by the second user 104. For example, control circuitry 404 may extract (e.g., via processing circuitry 406), from the user profile of the first user 102, a plurality of characteristics disfavored by the first user 102. Likewise, control circuitry 404 may extract (e.g., via processing circuitry 406), from the user profile of the second user 104, a plurality of characteristics favored by the second user 104. Control circuitry 404 may then compare (e.g., via processing circuitry 406) the plurality of characteristics disfavored by the first user 102 to the plurality of characteristics favored by the second user 104. In the illustrative embodiment, the control circuitry 404 may extract (e.g., via processing circuitry 406), from the user profile of the first user 102, preferences of the first user 102 indicating that the first user 102 dislikes sports, violent films/television shows, and science fiction. Control circuitry 404 may further extract (e.g., via processing circuitry 406), from the user profile of the second user 104, preferences of the second user 104 indicating that the second user 104 favors hockey, basketball, action films, and science fiction. Control circuitry 404 may then compare (e.g., via processing circuitry 406) the characteristics disfavored by the first user 102 (i.e., sports, violent films/television shows, and science fiction) to the characteristics favored by the second user 104 (i.e., hockey, basketball, action films, and science fiction).

At 1206, control circuitry 404 determines (e.g., via processing circuitry 406) whether a given characteristic is one of both the plurality of characteristics disfavored by the first user 102 and the plurality of characteristics favored by the second user 104. For example, control circuitry 404 may determine (e.g., via processing circuitry 406) that a given characteristic is disfavored by the first user 102 and favored by the second user 104. In the illustrative embodiment, control circuitry 404 may determine (e.g., via processing circuitry 406) that the characteristic science fiction is disfavored by the first user 102 and favored by the second user 104. In response to determining that a given characteristic is not one of both the plurality of characteristics disfavored by the first user and the plurality of characteristics favored by the second user, process 1200 ends. In response to determining that a given characteristic is one of both the plurality of characteristics disfavored by the first user and the plurality of characteristics favored by the second user, process 1200 proceeds to step 1208.

At 1208, control circuitry 404 selects (e.g., via processing circuitry 406), from the media asset identifiers included in the subset of media asset identifiers, a media asset identifier for a media asset having the given characteristic as the media asset for the media content recommendation 134. For example, control circuitry 404 may select (e.g., via processing circuitry 406) a media asset having the characteristic that is both disfavored by the first user 102 and favored by the second user 104 for the media content recommendation 134. In the illustrative embodiment, control circuitry 404 may select (e.g., via processing circuitry 406) a media asset having the science fiction characteristic for the media content recommendation 134.

What is claimed is:

1. A method for providing media content recommendations, the method comprising:
   receiving an input, via a microphone, of a conversation between a first user and a second user;
   detecting a phrase spoken by the first user in the conversation;
   determining that a given audio template of a plurality of audio templates matches the phrase;
   determining that the given audio template indicates that the first user will not be consuming media content with the second user during a future time interval;
   in response to determining that the given audio template indicates that the first user will not be consuming media content with the second user during the future time interval:
      identifying a subset of media asset identifiers from a plurality of media asset identifiers for media assets available for consumption during the future time interval, wherein a characteristic of each media asset of each media asset identifier in the subset matches a characteristic favored by the second user and a characteristic disfavored by the first user; and
      generating, for the future time interval, a media content recommendation of a media asset corresponding to a media asset identifier included in the subset; and
   generating for display, to the second user, the media content recommendation.

2. The method according to claim 1, wherein determining that the given audio template of the plurality of audio templates matches the phrase further comprises:
   generating an audio signature corresponding to the phrase;
   retrieving, from a database, a plurality of audio signatures corresponding to the plurality of audio templates; and
   comparing the generated audio signature to each of the plurality of audio signatures corresponding to the plurality of audio templates.

3. The method according to claim 1, wherein determining that the given audio template indicates that the first user will not be consuming media content with the second user during the future time interval further comprises:
   identifying a plurality of keywords corresponding to the given audio template;

determining that the plurality of keywords indicate a meaning of the phrase; and
determining that the meaning of the phrase indicates that the first user will not be consuming media content with the second user during the future time interval.

4. The method according to claim 1, wherein identifying the subset of media asset identifiers from the plurality of media asset identifiers for media assets available for consumption during the future time interval further comprises:
identifying a plurality of media assets available for consumption during the future time interval;
retrieving, from a database, a characteristic of each of the plurality of media assets;
retrieving, from the database, a user profile of the second user;
extracting, from the user profile of the second user, the characteristic favored by the second user; and
comparing the characteristic of each of the plurality of media assets available for consumption during the future time interval with the characteristic favored by the second user.

5. The method according to claim 4, wherein the subset of media asset identifiers is a first subset of media asset identifiers, and wherein identifying the first subset of media asset identifiers from the plurality of media asset identifiers for media assets available for consumption during the future time interval further comprises:
identifying a second subset of media asset identifiers, the second subset of media asset identifiers including media asset identifiers for each of the plurality of media assets having a characteristic that matches the characteristic favored by the second user;
retrieving, from the database, a user profile of the first user;
extracting, from the user profile of the first user, a characteristic disfavored by the first user;
comparing the characteristic of each media asset corresponding to the media asset identifiers included in the second subset of media asset identifiers with the characteristic disfavored by the first user; and
selecting, for inclusion in the first subset of media asset identifiers, media asset identifiers included in the second subset of media asset identifiers for media assets having a characteristic that matches the characteristic disfavored by the first user.

6. The method according to claim 4, wherein the subset of media asset identifiers is a first subset of media asset identifiers, and wherein identifying the first subset of media asset identifiers from the plurality of media asset identifiers for media assets available for consumption during the future time interval further comprises:
identifying a second subset of media asset identifiers, the second subset of media asset identifiers including media asset identifiers for each of the plurality of media assets having a characteristic that matches the characteristic favored by the second user;
retrieving, from the database, a user profile of the first user;
extracting, from the user profile of the first user, a characteristic disfavored by the first user;
comparing the characteristic of each of the plurality of media assets available for consumption during the future time interval with the characteristic disfavored by the first user;
identifying a third subset of media asset identifiers, the third subset of media asset identifiers including media asset identifiers for each of the plurality of media assets having a characteristic that matches the characteristic disfavored by the first user; and
selecting, for inclusion in the first subset of media asset identifiers, media asset identifiers included in both the second subset of media asset identifiers and the third subset of media asset identifiers.

7. The method according to claim 1, further comprising:
determining a degree of matching of the characteristic of each of the media assets corresponding to media asset identifiers included in the subset of media asset identifiers to the characteristic favored by the second user;
generating a list of the plurality of media assets corresponding to media asset identifiers included in the subset; and
ordering the list according to the degree of matching.

8. The method according to claim 7, wherein generating, for the future time interval, a media content recommendation of a media asset corresponding to a media asset identifier included in the subset of media asset identifiers further comprises selecting, from the list, a media asset identifier of a media asset having a characteristic with a highest degree of matching as the media asset for the media content recommendation.

9. The method according to claim 1, wherein the characteristic disfavored by the first user is a plurality of characteristics disfavored by the first user, wherein the characteristic favored by the second user is a plurality of characteristics favored by the second user, and wherein generating, for the future time interval, a media content recommendation of a media asset corresponding to a media asset identifier included in the subset of media asset identifiers further comprises:
comparing the plurality of characteristics disfavored by the first user to the plurality of characteristics favored by the second user;
determining that a given characteristic is one of both the plurality of characteristics disfavored by the first user and the plurality of characteristics favored by the second user; and
selecting, from the media asset identifiers included in the subset of media asset identifiers, a media asset identifier for a media asset having the given characteristic as the media asset for the media content recommendation.

10. The method according to claim 1, wherein generating for display, to the second user, the media content recommendation further comprises generating for display, to the second user, the media content recommendation at the future time interval.

11. A system for providing media content recommendations, the system comprising:
control circuitry configured to:
receive an input, via a microphone, of a conversation between a first user and a second user;
detect a phrase spoken by the first user in the conversation;
determine that a given audio template of a plurality of audio templates matches the phrase;
determine that the given audio template indicates that the first user will not be consuming media content with the second user during a future time interval;
in response to determining that the given audio template indicates that the first user will not be consuming media content with the second user during the future time interval:
identify a subset of media asset identifiers from a plurality of media asset identifiers for media assets available for consumption during the future time interval, wherein a characteristic of each media asset of each media asset identifier in the subset matches a characteristic favored by the second user and a characteristic disfavored by the first user; and generate, for the future time interval, a media content recommendation of a media asset corresponding to a media asset identifier included in the subset; and generate for display, to the second user, the media content recommendation.

12. The system according to claim 11, wherein the control circuitry, when determining that the given audio template of the plurality of audio templates matches the phrase, is further configured to:

generate an audio signature corresponding to the phrase;

retrieve, from a database, a plurality of audio signatures corresponding to the plurality of audio templates; and compare the generated audio signature to each of the plurality of audio signatures corresponding to the plurality of audio templates.

13. The system according to claim 11, wherein the control circuitry, when determining that the given audio template indicates that the first user will not be consuming media content with the second user during the future time interval, is further configured to:

identify a plurality of keywords corresponding to the given audio template;

determine that the plurality of keywords indicate a meaning of the phrase; and determine that the meaning of the phrase indicates that the first user will not be consuming media content with the second user during the future time interval.

14. The system according to claim 11, wherein the control circuitry, when identifying the subset of media asset identifiers from the plurality of media asset identifiers for media assets available for consumption during the future time interval, is further configured to:

identify a plurality of media assets available for consumption during the future time interval;

retrieve, from a database, a characteristic of each of the plurality of media assets;

retrieve, from the database, a user profile of the second user;

extract, from the user profile of the second user, the characteristic favored by the second user; and compare the characteristic of each of the plurality of media assets available for consumption during the future time interval with the characteristic favored by the second user.

15. The system according to claim 14, wherein the subset of media asset identifiers is a first subset of media asset identifiers, and wherein the control circuitry, when identifying the first subset of media asset identifiers from the plurality of media asset identifiers for media assets available for consumption during the future time interval, is further configured to:

identify a second subset of media asset identifiers, the second subset of media asset identifiers including media asset identifiers for each of the plurality of media assets having a characteristic that matches the characteristic favored by the second user;

retrieve, from the database, a user profile of the first user;

extracting, from the user profile of the first user, a characteristic disfavored by the first user;

compare the characteristic of each media asset corresponding to the media asset identifiers included in the second subset of media asset identifiers with the characteristic disfavored by the first user; and select, for inclusion in the first subset of media asset identifiers, media asset identifiers included in the second subset of media asset identifiers for media assets having a characteristic that matches the characteristic disfavored by the first user.

16. The system according to claim 14, wherein the subset of media asset identifiers is a first subset of media asset identifiers, and wherein the control circuitry, when identifying the first subset of media asset identifiers from the plurality of media asset identifiers for media assets available for consumption during the future time interval, is further configured to:

identify a second subset of media asset identifiers, the second subset of media asset identifiers including media asset identifiers for each of the plurality of media assets having a characteristic that matches the characteristic favored by the second user;

retrieve, from the database, a user profile of the first user;

extracting, from the user profile of the first user, a characteristic disfavored by the first user;

compare the characteristic of each of the plurality of media assets available for consumption during the future time interval with the characteristic disfavored by the first user;

identify a third subset of media asset identifiers, the third subset of media asset identifiers including media asset identifiers for each of the plurality of media assets having a characteristic that matches the characteristic disfavored by the first user; and select, for inclusion in the first subset of media asset identifiers, media asset identifiers included in both the second subset of media asset identifiers and the third subset of media asset identifiers.

17. The system according to claim 11, wherein the control circuitry is further configured to:

determine a degree of matching of the characteristic of each of the media assets corresponding to media asset identifiers included in the subset of media asset identifiers to the characteristic favored by the second user;

generate a list of the plurality of media assets corresponding to media asset identifiers included in the subset; and order the list according to the degree of matching.

18. The system according to claim 17, wherein the control circuitry, when generating, for the future time interval, a media content recommendation of a media asset corresponding to a media asset identifier included in the subset of media asset identifiers is further configured to select, from the list, a media asset identifier of a media asset having a characteristic with a highest degree of matching as the media asset for the media content recommendation.

19. The system according to claim 11, wherein the characteristic disfavored by the first user is a plurality of characteristics disfavored by the first user, wherein the characteristic favored by the second user is a plurality of characteristics favored by the second user, and wherein the control circuitry, when generating, for the future time interval, a media content recommendation of a media asset corresponding to a media asset identifier included in the subset of media asset identifiers, is further configured to:

compare the plurality of characteristics disfavored by the first user to the plurality of characteristics favored by the second user;

determine that a given characteristic is one of both the plurality of characteristics disfavored by the first user and the plurality of characteristics favored by the second user; and select, from the media asset identifiers included in the subset of media asset identifiers, a media asset identifier for a media asset having the given characteristic as the media asset for the media content recommendation.

20. The system according to claim 11, wherein the control circuitry, when generating for display, to the second user, the media content recommendation is further configured to generate for display, to the second user, the media content recommendation at the future time interval.

* * * * *